(12) United States Patent
Amaha et al.

(10) Patent No.: US 11,899,396 B2
(45) Date of Patent: Feb. 13, 2024

(54) TONER FOR DEVELOPMENT OF ELECTROSTATIC IMAGES

(71) Applicant: KAO CORPORATION, Tokyo (JP)

(72) Inventors: Yuka Amaha, Katsushika-ku (JP); Yuki Wakabayashi, Chiba (JP); Shogo Watanabe, Izumiotsu (JP)

(73) Assignee: KAO CORPORATION, Tokyo (JP)

( * ) Notice: Subject to any disclaimer, the term of this patent is extended or adjusted under 35 U.S.C. 154(b) by 247 days.

(21) Appl. No.: 17/291,138

(22) PCT Filed: Nov. 20, 2019

(86) PCT No.: PCT/JP2019/045377
§ 371 (c)(1),
(2) Date: May 4, 2021

(87) PCT Pub. No.: WO2020/105663
PCT Pub. Date: May 28, 2020

(65) Prior Publication Data
US 2021/0389687 A1 Dec. 16, 2021

(30) Foreign Application Priority Data
Nov. 20, 2018 (JP) .............................. 2018-217218

(51) Int. Cl.
| | | |
|---|---|---|
| G03G 5/087 | (2006.01) | |
| G03G 9/087 | (2006.01) | |
| C08F 283/02 | (2006.01) | |
| C08L 51/08 | (2006.01) | |
| G03G 15/08 | (2006.01) | |

(52) U.S. Cl.
CPC ....... *G03G 9/08786* (2013.01); *C08F 283/02* (2013.01); *C08L 51/08* (2013.01); *G03G 9/08797* (2013.01); *G03G 15/08* (2013.01); *C08L 2205/025* (2013.01)

(58) Field of Classification Search
CPC ........... G03G 9/08791; G03G 9/08793; G03G 9/08755; G03G 9/08704
See application file for complete search history.

(56) References Cited

U.S. PATENT DOCUMENTS

| | | |
|---|---|---|
| 5,116,713 A | 5/1992 | Uchida et al. |
| 2005/0164113 A1 | 7/2005 | Iwata |
| 2018/0136575 A1 | 5/2018 | Yoshida et al. |

FOREIGN PATENT DOCUMENTS

| | | | | |
|---|---|---|---|---|
| EP | 3 299 892 | * | 3/2018 | ............ G03G 9/087 |
| JP | 3-50561 A | | 3/1991 | |
| JP | 7-114208 A | | 5/1995 | |
| JP | 7-114209 A | | 5/1995 | |
| JP | 2004-4806 A | | 1/2004 | |
| JP | 2005-316378 A | | 11/2005 | |
| JP | 2006-098804 | * | 4/2006 | ............ G03G 9/087 |
| JP | 2006-98804 A | | 4/2006 | |
| JP | 2007-199300 A | | 8/2007 | |
| JP | 2009-14820 | | 1/2009 | |
| JP | 2016-11 4825 A | | 6/2016 | |
| JP | 2016-218448 A | | 12/2016 | |
| JP | 2017-90573 A | | 5/2017 | |
| JP | 2018-13600 | | 1/2018 | |
| JP | 2018-059964 | * | 4/2018 | ............ G03G 9/087 |
| JP | 2018-59964 A | | 4/2018 | |
| JP | 2019-8184 A | | 1/2019 | |
| JP | 2019-8185 A | | 1/2019 | |
| JP | 2019-95475 A | | 6/2019 | |
| WO | WO 2019/004095 A1 | | 1/2019 | |

OTHER PUBLICATIONS

Translation of JP 2018-059964.*
Translation of JP 2006-098804.*
International Search Report dated Dec. 17, 2019 in PCT/JP2019/045377 filed on Nov. 20, 2019, 2 pages.
U.S. Appl. No. 16/625,475, filed Dec. 20, 2019, Yuki Wakabayashi, et al.
Extended European Search Report dated Sep. 1, 2022 in European Patent Application No. 19886629.5, 7 pages.

* cited by examiner

*Primary Examiner* — Peter L Vajda
(74) *Attorney, Agent, or Firm* — Oblon, McClelland, Maier & Neustadt, L.L.P.

(57) ABSTRACT

The invention relates to a toner for development of electrostatic images excellent in fusing property on polypropylene films and excellent in rubfastness of printed images, and a resin composition for a toner for development of electrostatic images. The toner for development of electrostatic images and the resin composition for a toner for development of electrostatic images each contain an amorphous polyester-based resin A and a crystalline polyester-based resin C, wherein the amorphous polyester-based resin A has a constituent moiety derived from a polyester resin, and a constituent moiety derived from a reactive functional group-having modified polyolefin-based polymer A, the polyester resin-derived constituent moiety and the modified polyolefin-based polymer A-derived constituent moiety being bonded via a covalent bond, and the amount of the modified polyolefin-based polymer A-derived constituent moiety is 5% by mass or more and 30% by mass or less relative to the total amount of the resin component in the toner.

20 Claims, No Drawings

TONER FOR DEVELOPMENT OF ELECTROSTATIC IMAGES

FIELD OF THE INVENTION

The present invention relates to a toner for development of electrostatic images for use for developing latent images formed in an electrophotographic method, an electrostatic recording method, an electrostatic printing method, etc., and to a resin composition.

BACKGROUND OF THE INVENTION

In the field of electrophotography, with the progress of electrophotographic systems, it has been demanded to develop toners for development of electrostatic images which are adaptable for high image quality and high copying or printing speed.

JP 2005-316378 A (PTL 1) describes a polyester-based resin composition for toners, which contains at least a binder resin of a polyester and a wax and contains a compatibilizer to compatibilize a polyester and a wax, and in which the compatibilizer is prepared by reacting a polyester and a maleic anhydride-modified polyolefin. The compatibilizer is said to improve dispersibility of wax in a toner and make it possible to provide a toner excellent in low-temperature fusing property, high-temperature offset resistance, blocking resistance, spent resistance and filming resistance.

JP 2007-199300 A (PTL 2) describes a toner for development of electrostatic images containing at least a crystalline polyester resin, an amorphous resin, and a copolymer prepared by polymerizing an α-olefin and a maleic anhydride. The toner is said to be excellent in color reproducibility and transparency.

JP 2016-218448 A (PTL 3) describes a binder resin composition for toners for development of electrostatic images, which contains a polyester-based resin and a polypropylene wax (W-1) and has a ratio of endothermic energy amount $\Delta H_{CW/W}$ represented by the following expression (1) of 0.10 or more and 0.80 or less.

Ratio of Endothermic Energy Amount $\Delta H_{CW/W} = \Delta H_{CW}/\Delta H_W$ (1)

$\Delta H_{CW}$: Endothermic energy amount at the melting endotherm peak per gram of the polypropylene wax (W-1), measured as the binder resin composition.

$\Delta H_W$: Endothermic energy amount at the melting endotherm peak per gram of the polypropylene wax (W-1), measured as the polypropylene wax (W-1) alone.

The binder resin composition is said to give a toner excellent in fusing property on PP (polypropylene) films.

SUMMARY OF THE INVENTION

One embodiment of the present invention relates to the following [1] and [2].

[1] A toner for development of electrostatic images containing an amorphous polyester-based resin A and a crystalline polyester-based resin C, wherein:
the amorphous polyester-based resin A has a constituent moiety derived from a polyester resin, and a constituent moiety derived from a reactive functional group-having modified polyolefin-based polymer A, the polyester resin-derived constituent moiety and the modified polyolefin-based polymer A-derived constituent moiety being bonded via a covalent bond, and
the amount of the modified polyolefin-based polymer A-derived constituent moiety is 5% by mass or more and 30% by mass or less relative to the total amount of the resin component in the toner.

[2] A resin composition for a toner for development of electrostatic images containing an amorphous polyester-based resin A and a crystalline polyester-based resin C, wherein:
the amorphous polyester-based resin A has a constituent moiety derived from a polyester resin, and a constituent moiety derived from a reactive functional group-having modified polyolefin-based polymer A, the polyester resin-derived constituent moiety and the modified polyolefin-based polymer A-derived constituent moiety being bonded via a covalent bond, and
the amount of the modified polyolefin-based polymer A-derived constituent moiety is 5% by mass or more and 30% by mass or less relative to the total amount of the resin component in the toner.

DETAILED DESCRIPTION OF THE INVENTION

With the diversification of printing media, electrophotographic printing on any other printing media than paper has become desired. One of mainstream media is a polypropylene film (hereinafter also referred to as "PP film"), which is used for PET bottle labels and various packages. On the other hand, paper and polypropylene greatly differ in the characteristics as printing media, such as the polarity of the materials thereof and the surface conditions. Accordingly, the conventionally developed toners described in, for example, PTL 1 or 2 have such a problem that they are hardly fused onto PP films.

Even the toner disclosed in PTL 3 is still desired to have more excellent fusing property on PP films. In consideration of use modes for labels for PET bottles, a toner capable of giving images excellent in rubfastness is desired in a manner such that, after the toner is printed on PP films and when the resultant prints are rubbed, the printed images do not peel.

One embodiment of the present invention relates to a toner for development of electrostatic images excellent in fusing property on polypropylene films and excellent in rubfastness of printed images, and to a resin composition for a toner for development of electrostatic images.

According to one embodiment of the present invention, there can be provided a toner for development of electrostatic images excellent in fusing property on polypropylene films and excellent in rubfastness of printed images, and a resin composition for a toner for development of electrostatic images.

[Electrostatic Charge Image Developing Toner]

The toner for development of electrostatic images (hereinafter also simply referred to as "toner") of one embodiment of the present invention contains an amorphous polyester-based resin A (hereinafter also simply referred to as "resin A") and a crystalline polyester-based resin C (hereinafter also simply referred to as "resin C").

The resin A has a constituent moiety derived from a polyester resin, and a constituent moiety derived from a reactive functional group-having modified polyolefin-based polymer A (hereinafter also simply referred to as "polymer A"), the polyester resin-derived constituent moiety and the modified polyolefin-based polymer A-derived constituent moiety being bonded via a covalent bond.

With that, the amount of the polymer A-derived constituent moiety is 5% by mass or more and 30% by mass or less relative to the total amount of the resin component in the toner.

Having the constitution as above, the toner is excellent in fusing property on polypropylene films and excellent in rubfastness of printed images. Though not clear, the reason is considered to be as follows.

The toner of one embodiment of the present invention contains an amorphous polyester-based resin A that has a constituent moiety derived from a polyester resin, and a constituent moiety derived from the polymer A. In the resin A, the polymer A-derived constituent moiety and the polyester resin-derived constituent moiety are bonded via a covalent bond to have a structure complexed on a molecular level. With that, it is considered that the polymer A-derived constituent moiety in the polyester-based resin A may align in the PP film direction by heating for fusing in printing on PP films through electrophotography to express an intermolecular interaction between the PP film and the polyester-based resin A to thereby attain excellent fusing property on PP films.

In addition, the inventors have further found that, by adding a crystalline polyester-based resin C to the resin A-containing toner, the fusing property of the toner on films improves and the fusing strength thereof increases to enhance peel strength and rubfastness. This is considered to be because the resin C having relatively high hydrophobicity has a high affinity both for the polymer A-derived constituent moiety in the resin A and for PP films to express a strong intermolecular interaction at the interfaces therebetween, thereby providing a strong bonding force between the three components.

The definitions of various terms in this description are described below.

Whether a resin is crystalline or amorphous can be determined by the crystallinity index of the resin. The crystallinity index is defined by a ratio of the softening point of a resin to the endothermic maximum peak temperature derived from a resin or polyester resin-derived constituent moiety (softening point (° C.)/endothermic maximum peak temperature (° C.)) in the measurement method described in the section of Examples given hereinunder. A crystalline resin is a resin whose crystallinity index is 0.65 or more and less than 1.4, preferably 0.7 or more, more preferably 0.9 or more, and is preferably 1.2 or less. An amorphous resin is a resin whose crystallinity index is 1.4 or more or less than 0.65. The crystallinity index can be appropriately controlled depending on the kind and the ratio of raw material monomers, and the production conditions such as the reaction temperature, the reaction time and the cooling speed. The polyester resin-derived constituent moiety-derived endothermic peak can be assigned according to an ordinary method, and generally appears on a low-temperature side of an endothermic peak derived from a polymer A-derived constituent moiety. In the case where assignment to any peak is unclear, a polyester resin alone and a polymer A alone are separately measured using a differential scanning calorimeter under the condition mentioned above, and the endothermic peak at a temperature nearer to each endothermic peak thereof is assigned to the endothermic peak derived from each constituent moiety.

"Carboxylic acid compound" is a concept including not only the carboxylic acid itself but also an anhydride to form an acid through decomposition during reaction and an alkyl ester of a carboxylic acid (for example, the alkyl group has 1 or more and 3 or less carbon atoms).

In the case where a carboxylic acid compound is an alkyl ester of a carboxylic acid, the carbon number of the carboxylic acid compound does not include the carbon number of the alkyl group that is an alcohol residue of the ester.

"Resin component" means a resin component contained in the toner that contains an amorphous polyester-based resin A, an amorphous polyester-based resin B and a crystalline polyester-based resin C.

The toner contains the resin A and the resin C. Preferably, the toner further contains an amorphous polyester-based resin B having a softening point differing from that of the resin A by 5° C. or more. The resin composition for the toner for development of electrostatic images also contains the resin A and the resin C and preferably further contains the amorphous polyester-based resin B having a softening point differing from that of the resin A by 5° C. or more.

In the toner, the amount of the constituent moiety derived from the polymer A of the resin A is 5% by mass or more and 30% by mass or less relative to the total amount of the resin component in the toner, from the viewpoint of providing a toner excellent in fusing property on PP films and excellent in rubfastness of printed images.

The amount of the constituent moiety derived from the polymer A is preferably 8% by mass or more, more preferably 9% by mass or more, even more preferably 10% by mass or more, and is preferably 25% by mass or less, more preferably 20% by mass or less, from the viewpoint of enhancing the fusing property on PP films.

The amount of the polymer A-derived constituent moiety is calculated according to the following expression.

Amount of polymer $A$-derived constituent moiety (mass %)={[amount of the resin containing the polymer $A$-derived constituent moiety×proportion of the polymer $A$-derived constituent moiety in the resin]/[total amount of the resin component in the toner]}×100

The toner contains, for example, toner particles and external additives.

<Toner Particles>

The toner particles preferably contain the resin A and the resin C, more preferably the resin A, the resin B and the resin C.

In addition, the toner particles may contain additives such as a colorant, wax, a charge control agent, a magnetic powder, a fluidity enhancer, a conductivity controlling agent, a reinforcing filler such as a fibrous substance, an antioxidant, an antiaging agent, and a cleaning property enhancer.

[Amorphous Polyester-Based Resin A]

The amorphous polyester-based resin A has a constituent moiety derived from a polyester resin, and a constituent moiety derived from a reactive functional group-having modified polyolefin-based polymer A, the polyester resin-derived constituent moiety and the modified polyolefin-based polymer A-derived constituent moiety being bonded via a covalent bond from the viewpoint of providing a toner excellent in fusing property on PP films and excellent in rubfastness of printed images.

The polyester-based resin A may be a polyester resin modified in such a degree that the properties thereof are not substantially degraded. Examples of the modified polyester resin include a urethane-modified polyester resin where the polyester resin-derived constituent moiety is modified with a urethane bond, and an epoxy-modified polyester resin in which the polyester resin-derived constituent moiety is modified with an epoxy bond.

Bonding via a covalent bond means that the constituent moieties are bonded via a covalent bond.

Examples of bonding the constituent moieties via a covalent bond include an ester bond, an ether bond, an amide bond, a urethane bond, and a bond that contains a linking group to be coupled with any of these bonds.

Examples of the linking group include a divalent or higher polyvalent hydrocarbon group having 1 or more and 6 or less carbon atoms. Examples of the linking group include a methylene group, an ethylene group, a propylene group, and a phenylene group.

Above all, bonding through an ester bond is preferable, and direct bonding through an ester bond is more preferable.
(Polyester Resin-Derived Constituent Moiety)

Hereinunder the polyester resin-derived constituent moiety is described.

The "polyester resin-derived constituent moiety" means a resin constituent moiety in which a part of a polyester resin is bonded to any other molecular group.

For example, the polyester resin is a polycondensate of an alcohol component and a carboxylic acid component.
(Alcohol Component)

The alcohol component includes, for example, a dihydric or higher alcohol.

The content of the dihydric or higher alcohol is preferably 80% by mass or more, more preferably 90% by mass or more, even more preferably 95% by mass or more, and is 100% by mass or less.

Examples of the dihydric or higher alcohol include an aromatic group-having diol, a linear or branched aliphatic diol, an alicyclic diol, and a trihydric or higher alcohol. Among these, an aromatic group-having diol or a linear or branched aliphatic diol is preferred, an aromatic group-having diol is more preferred, and an alkylene oxide adduct of an aromatic diol is even more preferred.

The alkylene oxide adduct of an aromatic diol is preferably an alkylene oxide adduct of bisphenol A, more preferably an alkylene oxide adduct of bisphenol A represented by the following formula (I).

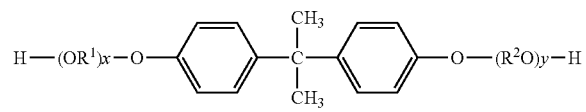

(I)

wherein $OR^1$ and $R^2O$ each represent an oxyalkylene group, $R^1$ and $R^2$ each independently represent an ethylene group or a propylene group, x and y each represent an average molar number of addition of an alkylene oxide, and each are a positive number, a sum of x and y is 1 or more, preferably 1.5 or more, and is 16 or less, preferably 8 or less, more preferably 4 or less.

Examples of the alkylene oxide adduct of bisphenol A include a propylene oxide adduct of bisphenol A, and an ethylene oxide adduct of bisphenol A. One alone or two or more of these may be used. Among these, a propylene oxide adduct of bisphenol A is preferred, from the viewpoint more enhancing fusing property on PP films The amount of the alkylene oxide adduct of bisphenol A is preferably 70 mol % or more in the alcohol component, more preferably 90 mol % or more, even more preferably 95 mol % or more, and is 100 mol % or less, further more preferably 100 mol %, from the viewpoint of more enhancing rubfastness.

The linear or branched aliphatic diol is preferably an aliphatic diol having a hydroxy group bonding to a secondary carbon atom. The carbon number of the aliphatic diol having a hydroxy group bonding to a secondary carbon atom is preferably 3 or more and 4 or less. Examples of the aliphatic diol having a hydroxy group bonding to a secondary carbon atom include 1,2-propanediol, 1,2-butanediol, 1,3-butanediol, and 2,3-butanediol.

In the case where the alcohol component contains an aliphatic diol having a hydroxy group bonding to a secondary carbon atom, the amount of the aliphatic diol having a hydroxy group bonding to a secondary carbon atom in the alcohol component is preferably 70 mol % or more, more preferably 90 mol % or more, even more preferably 95 mol % or more, and is 100 mol % or less, further more preferably 100 mol %.

Examples of the other linear or branched aliphatic diol include ethylene glycol, 1,3-propanediol, 1,4-butanediol, 1,6-hexanediol, 1,8-octanediol, 1,9-nonanediol, 1,10-decanediol, and 1,12-dodecanediol.

Examples of the alicyclic diol include hydrogenated bisphenol A [2,2-bis(4-hydroxycyclohexyl)propane], and an adduct of an alkylene oxide with 2 or more and 4 or less carbon atoms (having an average molar number of addition of 2 or more and 12 or less) of hydrogenated bisphenol A.

Examples of the trihydric or higher polyalcohol include glycerin, pentaerythritol, trimethylolpropane and sorbitol.

One alone or two or more kinds of these alcohol components may be used.
(Carboxylic Acid Component)

The carboxylic acid component includes, for example, a dibasic or higher carboxylic acid compound.

The content of the dibasic or higher carboxylic acid compound is preferably 80% by mass or more, more preferably 90% by mass or more, even more preferably 95% by mass or more, and is 100% by mass or less.

Examples of the dibasic or higher carboxylic acid compound include an aromatic dicarboxylic acid compound, a linear or branched aliphatic dicarboxylic acid compound, an alicyclic dicarboxylic acid compound, and a tribasic or higher polycarboxylic acid compound. Among these, an aromatic dicarboxylic acid compound is preferred.

Examples of the aromatic dicarboxylic acid include phthalic acid, isophthalic acid, and terephthalic acid. Among these, isophthalic acid and terephthalic acid are preferred, and terephthalic acid is more preferred.

The amount of the aromatic dicarboxylic acid is, in the carboxylic acid component, preferably 30 mol % or more, more preferably 50 mol % or more, even more preferably 80 mol % or more, further more preferably 90 mol % or more, and is 100 mol % or less.

The carbon number of the linear or branched aliphatic dicarboxylic acid is preferably 2 or more, more preferably 4 or more, even more preferably 8 or more, further more preferably 10 or more, and is preferably 22 or less, more preferably 16 or less.

Examples of the linear or branched aliphatic dicarboxylic acid include oxalic acid, malonic acid, maleic acid, fumaric acid, citraconic acid, itaconic acid, glutaconic acid, succinic acid, adipic acid, sebacic acid, dodecanedioic acid, tetradecanedioic acid, and succinic acid substituted with an aliphatic hydrocarbon group having 1 or more and 20 or less carbon atoms, and anhydrides thereof and esters thereof with an alkyl group having 1 or more and 3 or less carbon atoms.

Examples of succinic acid substituted with an aliphatic hydrocarbon group having 1 or more and 20 or less carbon atoms include dodecylsuccinic acid, dodecenylsuccinic acid and octenylsuccinic acid. Among these, succinic acid substituted with an aliphatic hydrocarbon group having 1 or more and 20 or less carbon atoms, and anhydrides thereof are preferred.

In the case where the carboxylic acid component contains a linear or branched aliphatic dicarboxylic acid, the amount of the linear or branched aliphatic dicarboxylic acid is, in the carboxylic acid component, preferably 2 mol % or more, more preferably 3 mol % or more, even more preferably 5 mol % or more, and is preferably 30 mol % or less, more preferably 20 mol % or less, even more preferably 10 mol % or less.

The tribasic or higher polycarboxylic acid is preferably a tribasic carboxylic acid, and examples thereof include trimellitic acid and an anhydride thereof. Among these, trimellitic acid or an anhydride thereof is preferred.

In the case where the carboxylic acid component contains a tribasic or higher polycarboxylic acid, the amount of the tribasic or higher polycarboxylic acid is, in the carboxylic acid component, preferably 1 mol % or more, more preferably 5 mol % or more, even more preferably 10 mol % or more, and is preferably 35 mol % or less, more preferably 30 mol % or less.

One alone or two or more kinds of these carboxylic acid components may be used.

The equivalent ratio of the carboxy group in the carboxylic acid component to the hydroxy group in the alcohol component (COOH group/OH group) is preferably 0.7 or more, more preferably 0.8 or more, and is preferably 1.3 or less, more preferably 1.2 or less.

(Polymer A-Derived Constituent Moiety)

The resin A has a polymer A-derived constituent moiety, from the viewpoint of providing a toner excellent in fusing property on PP films and excellent in rubfastness of printed images.

"Polymer A-derived constituent moiety" means a constituent moiety of the resin A in which a part of the polymer A is bonded to any other molecular group.

The polymer A is a modified polyolefin-based polymer A, from the viewpoint of enhancing the fusing property on PP films and the rubfastness of printed images.

Examples of the modified polyolefin-based polymer A include a modified polyethylene polymer, a modified polypropylene polymer, and a modified polybutylene polymer.

Among these, a modified polypropylene polymer is preferred, from the viewpoint of more enhancing the fusing property on PP films and the rubfastness of printed images.

The modified polyolefin-based polymer A has a reactive functional group, and examples of the reactive functional group include a carboxylic acid group, a carboxylic acid anhydride group, and a hydroxy group. Among these, a carboxylic acid group or a carboxylic acid anhydride group is preferred.

The polymer A is a polypropylene polymer modified with a carboxylic acid compound having an unsaturated bond or an anhydride thereof (hereinafter this may be referred to as "acid-modified polypropylene polymer"), from the viewpoint of enhancing the fusing property on PP films and the rubfastness of printed images.

Examples of an unmodified polypropylene polymer include polypropylene, and copolymers of propylene and any other olefin.

Examples of polypropylene include polypropylene obtained according to a method of polymerization of ordinary propylene, a method of thermally decomposing polypropylene for ordinary molding, which is used for containers and others, or a method of separating and purifying a low-molecular polypropylene that is formed as a side product in producing polypropylene for use for containers and others for ordinary molding.

Examples of the copolymer of propylene and any other olefin include a copolymer obtained through polymerization of propylene with any other olefin having an unsaturated bond capable of copolymerizing with propylene. The copolymer may be any of a random copolymer or a block copolymer.

Examples of the other olefin include ethylene, and an olefin having 4 or more and 10 or less carbon atoms. Examples of the other olefin include ethylene, butene, pentene, hexene and 2-ethylhexene.

Examples of the copolymer of propylene and other olefin include propylene/hexene copolymer, and ethylene/propylene copolymer.

Among these unmodified polypropylene polymers, polypropylene is preferred from the viewpoint of enhancing the fusing property on PP films and the rubfastness of printed images.

Examples of the acid-modified polypropylene polymer include a polypropylene polymer terminal-modified with an unsaturated bond-having carboxylic acid compound or an anhydride thereof (hereinafter this may be simply referred to as "terminal-modified polypropylene polymer"), and a polypropylene polymer randomly graft-modified with an unsaturated bond-having carboxylic acid compound or an anhydride thereof (hereinafter this may be simply referred to as "randomly graft-modified polypropylene polymer").

Among these, a polypropylene polymer terminal-modified with an unsaturated bond-having carboxylic acid compound or an anhydride thereof is preferred. The terminal-modified polypropylene polymer is preferably a polypropylene polymer modified with an unsaturated bond-having carboxylic acid compound or an anhydride thereof at one terminal only thereof (hereinafter this may be referred to as "one-terminal-modified polypropylene polymer"), from the viewpoint of enhancing the fusing property on PP films and the rubfastness of printed images.

Examples of the unsaturated bond-having carboxylic acid compound or an anhydride thereof include maleic anhydride, fumaric acid and itaconic acid. Among these, maleic anhydride is preferred.

The polypropylene polymer terminal-modified with an unsaturated bond-having carboxylic acid compound or an anhydride thereof can be obtained, for example, by ene-reaction of a polypropylene polymer having an unsaturated bond at the terminal thereof and an unsaturated bond-having carboxylic acid compound or an anhydride thereof. The polypropylene polymer having an unsaturated bond at one terminal thereof can be obtained according to a known method, and can be produced, for example, by using a vanadium catalyst, a titanium catalyst or a zirconium catalyst.

Examples of the polymer A include polypropylene terminally modified with maleic anhydride, and a copolymer of propylene terminally modified with maleic anhydride and any other olefin.

Among these, polypropylene terminally modified with maleic anhydride is preferred, and polypropylene terminally modified with maleic anhydride at one terminal thereof is more preferred, from the viewpoint of enhancing fusing property on polypropylene films. By introducing a maleic anhydride moiety into a polypropylene polymer, two polyester-based resin-derived constituent moieties can bond to each other via an ester bond. In particular, it is considered that, by using a polypropylene polymer terminally modified with maleic anhydride at one terminal thereof, a polyester-based resin having a structure where two polyester-based resin-derived constituent moieties are bonded to each other by the maleic anhydride moiety at the terminal of the polypropylene polymer can be obtained. Accordingly, it is considered that by using a polypropylene polymer terminally modified with maleic anhydride at one terminal thereof, fusing property on polypropylene films is more improved.

Examples of commercial products of the terminal-modified polypropylene polymer include polypropylene terminally-modified with maleic anhydride at one terminal "X-10065" (Mn=1,000), polypropylene terminally-modified with maleic anhydride at one terminal "X-10088" (Mn=2,500), polypropylene terminally-modified with maleic anhydride at one terminal "X-10082" (Mn=8,000), propylene/hexene copolymer terminally-modified with maleic anhydride at one terminal "X-10087" (Mn=800), propylene/hexene copolymer terminally-modified with maleic anhydride at one terminal "X-10053" (Mn=2,000) and propylene/hexene copolymer terminally-modified with maleic anhydride at one terminal "X-10052" (Mn=4,000) (all by Baker Hughes Incorporated).

The randomly-graft-modified polypropylene polymer is preferably a polypropylene polymer randomly grafted and modified with maleic anhydride (hereinafter this may be referred to as "randomly-graft maleic anhydride-modified polypropylene polymer").

The randomly-graft maleic anhydride-modified polypropylene polymer is preferably grafted with one or more maleic anhydride in one molecule. Whether or not the polymer is modified with maleic anhydride can be confirmed through general spectrometry. When modified with maleic anhydride, the double bond of maleic anhydride changes into a single bond, and therefore the modification can be confirmed through determination of the spectral change.

The randomly-graft-modified polypropylene polymer can be obtained, for example, by generating a radical in a polypropylene polymer molecule and reacting it with an unsaturated bond-having carboxylic acid compound or an anhydride thereof.

Examples of commercial products of the randomly-graft-modified polypropylene polymer include, as those of a randomly-graft maleic anhydride-modified polypropylene polymer, "M-100", "M-300", "M-310", "PMA H1000A", "PMA H1100A", "PMA H3000A", "PMA-T", "PMA-F2" and "PMA-L" of "TOYO-TAC®" series (all by TOYOBO CO., LTD.), "1001", "1010", "100TS" and "110TS" of "UMEX" series (all by Sanyo Chemical Industries, Ltd.), and "003" and "006" of "Kayabrit" series (all by Akzo Nobel N.V).

The melting point of the polymer A is preferably 10° C. or higher, more preferably 20° C. or higher, even more preferably 40° C. or higher, further more preferably 60° C. or higher, further more preferably 70° C. or higher, further more preferably 80° C. or higher, and is preferably 170° C. or lower, more preferably 150° C. or lower, even more preferably 140° C. or lower, further more preferably 120° C. or lower, further more preferably 100° C. or lower, from the viewpoint of enhancing fusing property on PP films.

The acid value of the polymer A is preferably 200 mgKOH/g or less, more preferably 150 mgKOH/g or less, even more preferably 100 mgKOH/g or less, and is preferably 0.1 mgKOH/g or more, more preferably 1 mgKOH/g or more, even more preferably 5 mgKOH/g or more, further more preferably 10 mgKOH/g or more, from the viewpoint of enhancing fusing property on PP films.

The melting point and the acid value are measured according to the methods described in the section of Examples.

The number-average molecular weight of the polymer A is, from the viewpoint of enhancing fusing property on PP films, preferably 300 or more, more preferably 500 or more, even more preferably 700 or more, further more preferably 800 or more, and is preferably 50,000 or less, more preferably 15,000 or less, even more preferably 8,000 or less, further more preferably 3,000 or less.

The number-average molecular weight is measured in gel permeation chromatography using polystyrene as a reference sample.

In the amorphous polyester-based resin A, the amount of the polymer A-derived constituent moiety is preferably 5% by mass or more, more preferably 8% by mass or more, even more preferably 10% by mass or more, further more preferably 15% by mass or more, from the viewpoint of enhancing fusing property on PP films and rubfastness, and is preferably 80% by mass or less, more preferably 60% by mass or less, even more preferably 40% by mass or less, further more preferably 35% by mass or less, from the viewpoint of storage stability.

Regarding the amount mentioned above, the amount of the polyester-based resin A is a total amount of the polymer A and the raw material monomer, and the amount of water due to dehydration in polycondensation is excluded.

[Production Method for Resin A]

The resin A can be produced, for example, according to (a) a method including polycondensation of a raw material monomer containing an alcohol component and a carboxylic acid component in the presence of a reactive functional group-having modified polyolefin-based polymer A, or (b) a method including reacting a polyester resin with a reactive functional group-having modified polyolefin-based polymer A.

In the case where the reactive functional group is a carboxylic acid group or a carboxylic anhydride group, the reaction (b) is, for example, dehydrating condensation or interesterification. The reaction condition is preferably a condition under which the carboxylic acid group or the carboxylic anhydride group of a polymer A reacts with an alcohol component and a carboxylic acid component through dehydrating condensation or interesterification.

Polycondensation of an alcohol component and a carboxylic acid component can be carried out, for example, in an inert gas atmosphere, optionally in the presence of an esterification catalyst and a polymerization inhibitor, at a temperature of around 150° C. or higher and 250° C. or lower. Examples of the esterification catalyst include a tin compound such as dibutyl tin oxide, and tin(II) 2-ethylhexanoate, and a titanium compound such as titanium diisopropylate bistriethanolaminate. An esterification promoter may be used along with the esterification catalyst, and examples thereof include gallic acid. The amount of the esterification catalyst to be used is preferably 0.01 parts by mass or more relative to 100 parts by mass of the total amount of the alcohol component and the carboxylic acid component, more preferably 0.1 parts by mass or more, and is preferably 1 part by mass or less, more preferably 0.8 parts by mass or less. The amount of the esterification promoter to be used is preferably 0.001 parts by mass or more relative to 100 parts by mass of the total amount of the alcohol component and the carboxylic acid component, more preferably 0.01 parts by mass or more, and is preferably 0.5 parts by mass or less, more preferably 0.1 parts by mass or less.

[Properties of Resin A]

The softening point of the resin A is preferably 80° C. or higher, more preferably 90° C. or higher, even more preferably 100° C. or higher, from the viewpoint of enhancing rubfastness, and is preferably 170° C. or lower, more preferably 150° C. or lower, even more preferably 120° C. or lower, further more preferably 110° C. or lower, from the viewpoint of enhancing fusing property on PP films.

The glass transition temperature of the resin A is preferably 40° C. or higher, more preferably 50° C. or higher, from the viewpoint of enhancing storage stability, and is preferably 80° C. or lower, more preferably 70° C. or lower, even more preferably 60° C. or lower, from the viewpoint of enhancing fusing property on PP films.

Preferably, the crystal melting peak of the polymer A-derived constituent moiety in the resin A is substantially not detected, or is 140° C. or lower, preferably 130° C. or lower, more preferably 120° C. or lower, even more preferably 110° C. or lower, and is preferably 60° C. or higher, more preferably 70° C. or higher, even more preferably 80° C. or higher, from the viewpoint of enhancing fusing property on PP films.

The polymer A-derived crystal melting peak temperature is measured according to the method described in the section of Examples.

The amount of the resin A is preferably 20% by mass or more relative to the total amount of the resin component in the toner, more preferably 30% by mass or more, even more preferably 40% by mass or more, and is preferably 90% by mass or less, more preferably 80% by mass or less, even more preferably 70% by mass or less, further more preferably 60% by mass or less.

[Amorphous Polyester-Based Resin B]

The toner may contain an amorphous polyester-based resin B having a softening point differing by 5° C. or more from the softening point of the resin A (hereinafter this may be simply referred to as "resin B").

The softening point of the resin B is preferably higher than the softening point of the resin A, and more preferably, the resin B has a softening point higher by 10° C. or more than the softening point of the resin A, even more preferably has a softening point higher by 15° C. or more than the softening point of the resin A, and further more preferably has a softening point higher by 20° C. or more than the softening point of the resin A.

The resin B is a polycondensate of an alcohol component and a carboxylic acid component. For the alcohol component and the carboxylic acid component, reference may be made to those exemplified hereinabove for the resin A.

[Properties of Resin B]

The softening point of the resin B is preferably 90° C. or higher, more preferably 110° C. or higher, even more preferably 120° C. or higher, and is preferably 170° C. or lower, more preferably 150° C. or lower, even more preferably 140° C. or lower, further more preferably 130° C. or lower, from the viewpoint of enhancing storage stability.

The glass transition temperature of the resin B is preferably 50° C. or higher, more preferably 55° C. or higher, even more preferably 60° C. or higher, and is preferably 80° C. or lower, more preferably 75° C. or lower, even more preferably 70° C. or lower.

The softening point and the glass transition temperature of the resin B can be adequately controlled depending on the kind of the raw material monomer and the amount thereof to be used, and on the production condition such as the reaction temperature, the reaction time and the cooling speed, and the values thereof can be measured according to the methods described in the section of Examples.

The resin B can be produced, for example, by polycondensation of an alcohol component and a carboxylic acid component. For the condition for polycondensation, reference may be made to the reaction condition indicated for the production method for the resin A given hereinabove.

In the case where the toner contains the resin B, the ratio by mass of the resin A to the resin B [resin A/resin B] is preferably 20/80 or more, more preferably 30/70 or more, even more preferably 40/60 or more, and is preferably 90/10 or less, more preferably 70/30 or less, even more preferably 60/40 or less.

When the toner contains the resin B, the content of the resin B is, in the resin component in the toner, preferably 10% by mass or more, more preferably 20% by mass or more, even more preferably 30% by mass or more, and is preferably 80% by mass or less, more preferably 70% by mass or less, even more preferably 60% by mass or less, further more preferably 50% by mass or less.

When the toner contains the resin B, the total content of the resin A and the resin B is preferably 40% by mass or more relative to the total amount of the resin component in the toner, more preferably 60% by mass or more, even more preferably 65% by mass or more, further more preferably 70% by mass or more, further more preferably 80% by mass or more, further more preferably 90% by mass or more, and is preferably 99.9% by mass or less, more preferably 99% by mass or less, even more preferably 97% by mass or less.

[Crystalline Polyester-Based Resin C]

The toner contains a crystalline polyester-based resin C (hereinafter this may be simply referred to as "resin C").

Preferably, the resin C has at least a polyester resin segment of a polycondensate of an alcohol component containing an α,ω-aliphatic diol and a carboxylic acid component containing an aliphatic dicarboxylic acid, and more preferably has the polyester resin segment and an addition polymer resin segment of an addition polymer of a raw material monomer containing a styrene compound.

(Alcohol Component)

The alcohol component contains an α,ω-aliphatic diol.

The α,ω-aliphatic diol is preferably an α,ω-linear aliphatic diol.

The carbon number of the α,ω-aliphatic diol is preferably 2 or more, more preferably 4 or more, even more preferably 6 or more, further more preferably 8 or more, further more preferably 10 or more, and is preferably 16 or less, more preferably 14 or less, even more preferably 12 or less.

Examples of the α,ω-aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decane 1,11-undecanediol, 1,12-dodecanediol, 1,13-tridecanediol, and 1,14-tetradecanediol. Among these, ethylene glycol, 1,4-butanediol, 1,6-hexanediol, 1,10-decanediol or 1,12-dodecanediol is preferred, and 1,10-decanediol or 1,12-dodecanediol is more preferred.

The amount of the α,ω-aliphatic diol is, in the alcohol component, preferably 80 mol % or more, more preferably 85 mol % or more, even more preferably 90 mol % or more, further more preferably 95 mol % or more, and is 100 mol % or less, further more preferably 100 mol %.

The alcohol component may contain any other alcohol component different from α,ω-aliphatic diols. Examples of the other alcohol component include an aliphatic diol except α,ω-aliphatic diols, such as 1,2-propylene glycol, and neopentyl glycol; an aromatic diol such as bisphenol A alkylene oxide adduct; and a trihydric or higher polyalcohol such as glycerin, pentaerythritol, and trimethylolpropane. One kind or two or more kinds of these alcohol components may be used.

(Carboxylic Acid Component)

The carboxylic acid component contains an aliphatic dicarboxylic acid.

The aliphatic dicarboxylic acid is preferably a linear aliphatic dicarboxylic acid.

The carbon number of the aliphatic dicarboxylic acid is preferably 4 or more, more preferably 8 or more, even more preferably 10 or more, and is preferably 14 or less, more preferably 12 or less.

Examples of the aliphatic dicarboxylic acid include fumaric acid, sebacic acid, dodecanedioic acid, and tetradecanedioic acid. Among these, sebacic acid or dodecanedioic acid is preferred, and sebacic acid is more preferred. One kind or two or more kinds of these carboxylic acids may be used.

The amount of the aliphatic dicarboxylic acid is, in the carboxylic acid component, preferably 80 mol % or more, more preferably 85 mol % or more, even more preferably 90 mol % or more, further more preferably 95 mol % or more, and is 100 mol % or less, further more preferably 100 mol %.

The carboxylic acid component may contain any other carboxylic acid component different from aliphatic dicarboxylic acids. Examples of the other carboxylic acid component include an aromatic dicarboxylic acid such as terephthalic acid and isophthalic acid; and a tribasic or higher polycarboxylic acid. One kind or two or more kinds of these carboxylic acid components may be used either singly or as combined.

The equivalent ratio of the carboxy group in the carboxylic acid component to the hydroxy group in the alcohol component (COOH group/OH group) is preferably 0.7 or more, more preferably 0.8 or more, and is preferably 1.3 or less, more preferably 1.2 or less.

(Addition Polymer Resin Segment)

The addition polymer resin segment is, for example, an addition polymer of a raw material monomer containing a styrene compound.

Examples of the styrene compound include substituted or unsubstituted styrenes. Examples of the substituent include an alkyl group having 1 or more and 5 or less carbon atoms, a halogen atom, an alkoxy group having 1 or more and 5 or less carbon atoms, a sulfonic acid group and a salt thereof.

Examples of the styrene compound include styrene compounds such as styrene, methylstyrene, α-methylstyrene, β-methylstyrene, tert-butylstyrene, chlorostyrene, chloromethylstyrene, methoxystyrene, styrenesulfonic acid and salts thereof. Among these, styrene is preferred.

The content of the styrene compound is, in the raw material monomer for the addition polymer resin segment, preferably 50% by mass or more, more preferably 70% by mass or more, even more preferably 80% by mass or more, further more preferably 90% by mass or more, and is 100% by mass or less, preferably 98% by mass or less, more preferably 95% by mass or less.

Examples of the other raw material monomer include alkyl (meth)acrylates such as 2-ethylhexyl (meth)acrylate; an ethylenically unsaturated monoolefins such as ethylene and propylene; conjugated dienes such as butadiene; halovinyl compounds such as vinyl chloride; vinyl esters such as vinyl propionate; aminoalkyl (meth)acrylates such as dimethylaminoethyl (meth)acrylate; vinyl ethers such as methyl vinyl ether; vinylidene halides such as vinylidene chloride; and N-vinyl compounds such as N-vinylpyrrolidone.

(Bireactive Monomer-Derived Constituent Unit)

Preferably, the resin C has a constituent unit derived from a bireactive monomer bonding to a polyester resin segment and an addition polymer resin segment via a covalent bond, for linking the polyester resin segment and the addition polymer resin segment.

"Constituent unit derived from a bireactive monomer" means a unit formed through reaction of an ethylenically-unsaturated group, which is a functional group of a bireactive monomer.

Examples of the bireactive monomer include an ethylenically-unsaturated monomer having, in the molecule, at least one functional group selected from a hydroxy group, a carboxy group, an epoxy group, a primary amino group and a secondary amino group. Among these, an ethylenically-unsaturated monomer having a hydroxy group or a carboxy group is preferred, and an ethylenically-unsaturated monomer having a carboxy group is more preferred, from the viewpoint of reactivity.

Examples of the bireactive monomer include acrylic acid, methacrylic acid, fumaric acid, and maleic acid. Among these, acrylic acid and methacrylic acid are preferred, and acrylic acid is more preferred, from the viewpoint of reactivity in both polycondensation reaction and addition polymerization reaction.

The amount of the constituent unit derived from a bireactive monomer is, relative to 100 parts by mol of the alcohol component of the polyester resin segment of the resin C, preferably 1 part by mol or more, more preferably 3 parts by mol or more, even more preferably 5 parts by mol or more, and is preferably 30 parts by mol or less, more preferably 25 parts by mol or less, even more preferably 20 parts by mol or less.

The amount of the polyester resin segment is, in the resin C, preferably 40% by mass or more, more preferably 50% by mass or more, and is preferably 95% by mass or less, more preferably 85% by mass or less.

The amount of the addition polymer resin segment is, in the resin C, preferably 5% by mass or more, more preferably 10% by mass or more, even more preferably 15% by mass or more, and is preferably 60% by mass or less, more preferably 50% by mass or less.

The amount of the bireactive monomer-derived constituent unit is, in the resin C, preferably 0.1% by mass or more, more preferably 0.5% by mass or more, even more preferably 0.8% by mass or more, and is preferably 10% by mass or less, more preferably 5% by mass or less, even more preferably 3% by mass or less.

In the case where the resin C has the polyester resin segment and the addition polymer resin segment, the total amount of the polyester resin segment, the addition polymer resin segment and the bireactive monomer-derived constituent unit is preferably 80% by mass or more, more preferably 90% by mass or more, even more preferably 93% by mass or more, further more preferably 95% by mass or more, and is 100% by mass or less.

The above amount is calculated on the basis of the ratio of the amount of the raw material monomer for the polyester resin segment and the addition polymer resin segment, the bireactive monomer and the polymerization initiator, and the amount of water due to dehydration in polycondensation for the polyester resin segment and others is excluded. In the case where a polymerization initiator is used, the mass of the polymerization initiator is calculated as included in the addition polymer resin segment.

[Production Method for Resin C]

The production method for the resin C includes, for example, polycondensation of an alcohol component and a carboxylic acid component, and addition polymerization of a raw material monomer for an addition polymer resin segment and a bireactive monomer.

The condition for polycondensation is as described above for the production method for the resin A, and as needed, a radical polymerization inhibitor such as 4-tert-butylcatechol may be used in an amount of 0.001 parts by mass or more and 0.5 parts by mass or less relative to 100 parts by mass of the total amount of the alcohol component and the carboxylic acid component in polycondensation thereof.

Preferably, a part of the carboxylic acid is subjected to polycondensation and then after addition polymerization, the reaction temperature is again elevated and the remaining amount thereof is added to the reaction system, from the viewpoint of further promoting the polycondensation and optionally the reaction with a bireactive monomer.

In addition polymerization, a raw material monomer for an addition polymer resin segment and a bireactive monomer are reacted for addition polymerization. The temperature of the addition polymerization is preferably 110° C. or higher, more preferably 130° C. or higher, and is preferably 220° C. or lower, more preferably 200° C. or lower. Preferably, the reaction system is depressurized in the latter half of polymerization to promote the reaction.

As the polymerization initiator for the addition polymerization, any known polymerization initiator can be used, and examples thereof include peroxides such as di-tert-butyl peroxide, persulfates such as sodium persulfate, and azo compounds such as 2,2'-azobis(2,4-dimethylvaleronitrile).

The amount of the polymerization initiator relative to 100 parts by mass of the raw material monomer for the addition polymer resin segment is preferably 1 part by mass or more, more preferably 3 parts by mass or more, even more preferably 5 parts by mass or more, and is preferably 20 parts by mass or less, more preferably 15 parts by mass or less, even more preferably 10 parts by mass or less.

[Properties of Resin C]

The softening point of the resin C is preferably 60° C. or higher, more preferably 70° C. or higher, even more preferably 80° C. or higher, from the viewpoint of enhancing rubfastness, and is preferably 170° C. or lower, more preferably 150° C. or lower, even more preferably 120° C. or lower, further more preferably 110° C. or lower, from the viewpoint of enhancing fusing property on PP films.

The melting point of the resin C is preferably 50° C. or higher, more preferably 60° C. or higher, even more preferably 70° C. or higher, from the viewpoint of enhancing rubfastness, and is preferably 100° C. or lower, more preferably 95° C. or lower, even more preferably 90° C. or lower, from the viewpoint of enhancing fusing property on PP films.

The Fedors' solubility parameter (hereinafter this may be simply referred to as "SP value") of the resin C is preferably 9.0 $(cal/cm^3)^{1/2}$ or more, more preferably 9.2 $(cal/cm^3)^{1/2}$ or more, even more preferably 9.4 $(cal/cm^3)^{1/2}$ or more, and is preferably 10.5 $(cal/cm^3)^{1/2}$ or less, more preferably 10.3 $(cal/cm^3)^{1/2}$ or less, even more preferably 9.9 $(cal/cm^3)^{1/2}$ or less, further more preferably 9.8 $(cal/cm^3)^{1/2}$ or less, further more preferably 9.7 $(cal/cm^3)^{1/2}$ or less, further more preferably 9.6 $(cal/cm^3)^{1/2}$ or less, from the viewpoint of enhancing fusing property on PP films and rubfastness of printed images.

In this description, "SP value" is one calculated according to the method described in "POLYMER ENGINEERING AND SCIENCE, FEBRUARY, 1974, Vol. 14, No. 2, ROBERT F. FEDORS. (pp. 147-154)" by Fedors, et al.

The softening point, the glass transition temperature and the SP value of the resin C can be adequately controlled depending on the kind of the raw material monomer and the amount thereof used, and on the production condition such as the reaction temperature, the reaction time and the cooling speed, and the softening point and the glass transition temperature can be measured according to the methods described in the section of Examples.

The amount of the resin C is, relative to the total amount of the resin component in the toner, preferably 0.1% by mass or more, more preferably 1% by mass or more, even more preferably 3% by mass or more, and is preferably 60% by mass or less, more preferably 40% by mass or less, even more preferably 35% by mass or less, further more preferably 30% by mass or less, further more preferably 20% by mass or less, further more preferably 10% by mass or less.

The ratio by mass of the amount of the resin C to the total amount of the resin A and the resin B (resin C/(resin A+resin B)) is preferably 0.1/99.9 or more, more preferably 1/99 or more, even more preferably 3/97 or more, and is preferably 60/40 or less, more preferably 40/60 or less, even more preferably 35/65 or less, further more preferably 30/70 or less.

The ratio by mass of the amount of the modified polyolefin-based polymer A-derived constituent moiety to the amount of the crystalline polyester-based resin C (polymer A/resin C) is preferably 10/90 or more, more preferably 20/80 or more, even more preferably 30/70 or more, further more preferably 40/60 or more, and is preferably 90/10 or less, more preferably 80/20 or less, even more preferably 75/25 or less.

[Colorant]

The toner may contain a colorant.

The colorant may be any of dyes, pigments, and the like that have been used as a colorant for toner, and examples thereof include carbon black, phthalocyanine blue, permanent brown FG, brilliant fast scarlet, pigment green B, rhodamine-B base, solvent red 49, solvent red 146, solvent blue 35, quinacridone, carmine 6B, and disazo yellow. The toner may be any of a black toner and other color toners.

The content of the colorant is preferably 1 part by mass or more relative to 100 parts by mass of the total amount of the resin component in the toner, more preferably 2 parts by mass or more, even more preferably 3 parts by mass or more, and is preferably 40 parts by mass or less, more preferably 20 parts by mass or less, even more preferably 10 parts by mass or less.

<Releasing Agent>

The toner may contain a releasing agent.

The releasing agent includes wax.

Examples of wax include polypropylene wax, polyethylene wax, polypropylene-polyethylene copolymer wax; aliphatic hydrocarbon wax or oxides thereof such as microcrystalline wax, paraffin wax, Fischer-Tropsch wax, and Sazole wax; ester wax such as carnauba wax, montan wax or deoxygenated wax thereof, and fatty acid ester wax; fatty acid amides, fatty acids, higher alcohols, and fatty acid metal salts. One alone of these or two or more thereof may be used either singly or as combined.

The melting point of the releasing agent is preferably 60° C. or higher, more preferably 70° C. or higher, and is preferably 160° C. or lower, more preferably 140° C. or lower, even more preferably 120° C. or lower.

The content of the releasing agent is preferably 0.5 part by mass or more relative to 100 parts by mass of the total amount of the resin component in the toner, more preferably 1 part by mass or more, even more preferably 1.5 parts by mass or more, and is preferably 10 parts by mass or less, more preferably 8 parts by mass or less.

[Charge Control Agent]

The toner may contain a charge control agent.

The charge control agent may be any of a positive charge control agent and a negative charge control agent.

Examples of the positive charge control agent include a nigrosine dye, such as "Nigrosine Base EX", "Oil Black BS", "Oil Black SO", "Bontron N-01", "Bontron N-04", "Bontron N-07", "Bontron N-09", and "Bontron N-11" (all by ORIENT CHEMICAL INDUSTRIES CO., LTD.); a triphenylmethane dye having a tertiary amine as a side chain, a quaternary ammonium salt compound, such as "Bontron P-51" (by ORIENT CHEMICAL INDUSTRIES CO., LTD.), cetyltrimethylammonium bromide, "Copy Charge PX VP435" (by Clariant AG); a polyamine resin, such as "AFP-B" (by ORIENT CHEMICAL INDUSTRIES CO., LTD.); an imidazole derivative, such as "PLZ-2001" and "PLZ-8001" (all by SHIKOKU CHEMICALS CORPORATION); and a styrene-acrylic resin, such as "FCA-701PT" (by Fujikura Kasei Co., Ltd.).

Examples of the negative charge control agent include a metal-containing azo dye, such as "Valifast Black 3804", "Bontron S-31", "Bontron S-32", "Bontron S-34", and "Bontron S-36" (all by ORIENT CHEMICAL INDUSTRIES CO., LTD.), and "Aizen Spilon Black TRH" and "T-77" (all by Hodogaya Chemical Co., Ltd.); a metal compound of a benzilic acid compound, such as "LR-147" and "LR-297" (all by Japan Carlit Co., Ltd.), a metal compound of a salicylic acid compound, such as "Bontron E-81", "Bontron E-84", "Bontron E-88", and "Bontron E-304" (all by ORIENT CHEMICAL INDUSTRIES CO., LTD.), and "TN-105" (by Hodogaya Chemical Co., Ltd.); a copper phthalocyanine dye; a quaternary ammonium salt, such as "Copy Charge NX VP434" (by Clariant AG), a nitroimidazole derivative; and an organic metal compound.

The content of the charge control agent is preferably 0.01 part by mass or more relative to 100 parts by mass of the total amount of the resin component in the toner, more preferably 0.2 part by mass or more, and is preferably 10 parts by mass or less, more preferably 5 parts by mass or less, even more preferably 2 parts by mass or less.

The volume median diameter ($D_{50}$) of the toner particles is preferably 3 μm or more, more preferably 4 μm or more, even more preferably 6 μm or more, and is preferably 15 μm or less, more preferably 10 μm or less.

In this description, the volume median diameter ($D_{50}$) means a particle size to reach 50% of cumulative volume frequency of particle diameters calculated as volume fraction from smaller particles.

The content of the toner particles is, in the toner, preferably 90% by mass or more, more preferably 93% by mass or more, even more preferably 95% by mass or more, and is 100% by mass or less, preferably 99% by mass or less.

<External Additive>

Preferably, the toner uses an external additive for improving fluidity. Examples of the external additive include inorganic fine particles, such as silica fine particles, alumina fine particles, titania fine particles, zirconia fine particles, tin oxide fine particles and zinc oxide fine particles, and organic fine particles, such as melamine resin fine particles, and polytetrafluoroethylene resin fine particles. One kind alone of these or two or more kinds thereof may be used either singly or as combined.

Silica is, for example, a hydrophobic silica that has been treated for hydrophobization.

Examples of the hydrophobizing agent for hydrophobizing the surfaces of silica fine particles include hexamethyldisilazane (HMDS), dimethyldichlorosilane (DMDS), silicone oil, octyltriethoxysilane (OTES), and methyltriethoxysilane. One alone of these or two or more thereof may be used.

The number-average particle size of the external additive is preferably 10 nm or more, more preferably 15 nm or more, and is preferably 200 nm or less, more preferably 120 nm or less, even more preferably 90 nm or less.

The content of the external additive is preferably 0.05 part by mass or more relative to 100 parts by mass of the toner particles, more preferably 0.1 part by mass or more, even more preferably 0.3 part by mass or more, and is preferably 5 parts by mass or less, more preferably 3 parts by mass or less.

[Production Method for Toner]

The toner may be any toner obtained according to a known method such as a melt-kneading method, an emulsion phase inversion method, a polymerization method or an aggregation coalescence method, but a pulverized toner according to a melt-kneading method or a chemical toner according to an aggregation coalescence method is preferred from the viewpoint of productivity and colorant dispersibility.

In the case of a pulverized toner according to a melt-kneading method, for example, raw materials of a binder resin, a colorant, a releasing agent, a charge control agent are uniformly mixed in a mixing machine such as a Henschel mixer, then melt-kneaded in a closed kneader, a single-screw or twin-screw extruder, an open roll kneading machine or the like, and thereafter cooled, pulverized and classified to produce a toner.

In the case of a chemical toner according to an aggregation coalescence method, the production method preferably includes a step (step 1) of aggregating resin particles and optionally colorant particles and releasing agent particles in an aqueous medium, and a step (step 2) of coalescing the aggregated particles. The step 1 is preferably a step of preparing a dispersion of resin particles, and optionally a dispersion of colorant particles and a dispersion of releasing agent particles, and then mixing these to aggregate the resin particles, the colorant particles and the releasing agent particles.

<Step 1>

[Dispersion of Resin Particles]

The dispersion of resin particles contains resin particles X, and the resin particles X contain the amorphous polyester-based resin A and the crystalline polyester-based resin C in the same or different particles, and preferably further contain the amorphous polyester-based resin B. In the step 1, preferably, resin particles containing the resin A and the resin C in the same particles are used, and more preferably resin particles containing the resin A, the resin B and the resin C in the same particles are used.

The dispersion of resin particles can be prepared by dispersing the resin in an aqueous medium.

The aqueous medium is preferably one consisting primarily of water, and the content of water in the aqueous medium is preferably 80% by mass or more, more preferably 90% by mass or more, and is 100% by mass or less from the viewpoint of improving dispersing stability of the dispersion of resin particles and from the viewpoint of environmental load reduction. The other component than water contained in the aqueous medium includes an organic solvent soluble in water.

The resin particles can be dispersed according to a known method, and for example, an emulsion phase inversion method of adding an aqueous medium to a resin solution in an organic solvent or to a molten resin for phase-transfer emulsification is employable.

The organic solvent for use for phase-transfer emulsification is not specifically limited so far as it can dissolve a resin, but methyl ethyl ketone and ethyl acetate are preferred, from the viewpoint that the solvent is easy to remove from a mixed liquid after addition of an aqueous medium thereto.

A neutralizing agent is optionally added to the solution in an organic solvent. Examples of the neutralizing agent include an alkali metal hydroxide such as sodium hydroxide and potassium hydroxide; and a nitrogen-containing basic material such as ammonia, trimethylamine and diethanolamine.

With stirring the solution in an organic solvent or the molten resin, an aqueous medium is added for phase inversion. For the stirring, an ordinary mixing and stirring device such as an anchor blade, as well as a high-speed stirring and mixing device such as Disper (by Asada Iron Works Co., Ltd.), T. K Homomixer, T. K. Homodisper, and T. K. Robomix (all by Primix Corporation), Creamix (by M Technique Co., Ltd.), and KD Mill (by KD International Corporation) can be used.

The temperature of the organic solvent solution in adding the aqueous medium thereto is, though depending on the boiling point of the organic solvent used but, preferably not lower than the glass transition temperature of the resin A to constitute the resin particles X, and is preferably 90° C. or lower, more preferably 80° C. or lower, from the viewpoint of improving the dispersing stability of the resin particles X.

After phase-transfer emulsification, as needed, the organic solvent may be removed from the resultant dispersion through distillation or the like.

The volume median particle diameter $D_{50}$ of the resin particles X in the dispersion is preferably 0.05 µm or more, more preferably 0.08 µm or more, and is preferably 1 µm or less, more preferably 0.5 µm or less, even more preferably 0.3 µm or less, from the viewpoint of providing a toner capable of giving a high-quality image.

The CV value of the resin particles X in the dispersion is preferably 10% or more, more preferably 20% or more, and is preferably 40% or less, more preferably 35% or less, from the viewpoint of providing a toner capable of giving a high-quality image.

The volume median particle diameter $D_{50}$ and the CV value are determined according to the methods described in the section of Examples given hereinunder.

In the case where a dispersion of resin particles containing the resin A, a dispersion of resin particles containing the resin C and a dispersion of resin particles containing the resin B are used, or where a dispersion of resin particles containing the resin A and the resin C and a dispersion of resin particles containing the resin B are used, these dispersions can be prepared according to the production method for the resin particles X mentioned hereinabove. Preferred ranges of the volume median diameter $D_{50}$ and the CV value of the resin particles in the dispersions of those resin particles are the same as the above-mentioned ranges.

Not using an organic solvent, the dispersion of resin particles can be prepared by mixing them with a surfactant.

[Dispersion of Releasing Agent Particles]

A dispersion of releasing agent particles can be prepared by dispersing a releasing agent in an aqueous medium, and is preferably prepared by dispersing a releasing agent at a temperature not lower than the melting point of the releasing agent, using a disperser. Examples of the disperser include a homogenizer, and an ultrasonic disperser.

Preferred embodiments of the aqueous medium for use for the dispersion of releasing agent particles are the same as those used in preparing the dispersion of resin particles.

The dispersion of releasing agent particles can also be prepared using a surfactant, but is preferably prepared by mixing a releasing agent and resin particles Z. The resin that constitutes the resin particles Z to be used in dispersing a releasing agent is preferably a polyester-based resin. Preferred ranges of resin properties, preferred production methods, and preferred ranges of particle size and CV value are the same as those of the resin particles X mentioned above.

The amount of the resin particles Z to be used is preferably 5 parts by mass or more relative to 100 parts by mass of the releasing agent, more preferably 10 parts by mass or more, even more preferably 20 parts by mass or more, and is preferably 70 parts by mass or less, more preferably 60 parts by mass or less, from the viewpoint of dispersing stability.

The volume median diameter (DO of the releasing agent particles in the dispersion of releasing agent particles is preferably 0.1 µm or more, more preferably 0.3 µm or more, and is preferably 1 µm or less, more preferably 0.7 µm or less, from the viewpoint of enhancing fusing property on PP films.

The CV value of the releasing agent particles in the dispersion of releasing agent particles is preferably 10% or more, more preferably 20% or more, and is preferably 40% or less, more preferably 30% or less, from the viewpoint of the dispersing stability of the releasing agent particles.

[Dispersion of Colorant Particles]

Preferably, the colorant is added as a dispersion of colorant particles that contains colorant particles.

Preferably, a dispersant is used for dispersing the colorant, and an anionic surfactant is preferred.

As the anionic surfactant, an alkylbenzenesulfonate and an alkyl ether sulfate are preferred.

The volume median diameter ($D_{50}$) of the colorant particles in the dispersion of colorant particles is preferably 0.05 µm or more, more preferably 0.08 µm or more, even more preferably 0.1 µm or more, and is preferably 0.5 µm or less, more preferably 0.3 µm or less, even more preferably 0.2 µm or less, from the viewpoint of attaining high-quality images.

In the case where other components such as a charge control agent are added, preferably, the component is added as an aqueous dispersion thereof like the dispersion of releasing agent particles and the dispersion of colorant particles.

For efficient aggregation, preferably, an aggregating agent is added in the step 1.

[Aggregating Agent]

Examples of the aggregating agent include organic aggregating agents such as a cationic surfactant in the form of a quaternary salt and polyethyleneimine; and inorganic aggregating agents. Examples of the inorganic aggregating agent include inorganic metal salts such as sodium sulfate, sodium nitrate, sodium chloride, calcium chloride, and calcium nitrate; inorganic ammonium salts such as ammonium sulfate, ammonium chloride, and ammonium nitrate; and divalent or higher metal complexes.

Using an aggregating agent, for example, an aggregating agent in an amount of 5 parts by mass or more and 50 parts by mass or less relative to the total amount, 100 parts by mass of resins is added to a mixed dispersion containing resin particles and colorant particles at 0° C. or higher and 40° C. or lower so that the resin particles and the colorant particles are aggregated in an aqueous medium to give aggregated particles. Further preferably, the temperature of the dispersion is increased after addition of the aggregating agent thereto, from the viewpoint of accelerating aggregation.

Resin particles containing a resin A' may be further added to resin particles containing at least the resin A and the resin C, and optionally the aggregated particles prepared by aggregating releasing agent particles and colorant particles, to thereby produce aggregated particles where resin particles containing the resin A' are attached to the aggregated particles containing resin particles that contain the resin A and the resin C. Accordingly, there can be provided toner particles having a core-shell structure that contains resin particles containing the resin A and the resin C in the core part and contains the resin A' in the shell part.

The resin A' is preferably a polyester resin of a polycondensate of an alcohol component and a carboxylic acid component. The resin A' is preferably an amorphous polyester resin.

Preferred examples of the alcohol component and the carboxylic acid component for the resin A', and preferred ranges of properties thereof are the same as those exemplified for the polyester resin-derived constituent moieties of the amorphous polyester-based resin A. The method for preparing a dispersion of resin particles containing the resin A' is the same as the production method for the resin particles X.

The ratio by mass of the resin particles containing the resin A' to the resin particles containing the resin A and the resin C [A'/A+C] is preferably 0.05 or more, more preferably 0.1 or more, even more preferably 0.13 or more, further more preferably 0.15 or more, and is preferably 0.5 or less, more preferably 0.3 or less, even more preferably 0.25 or less.

At the time when the aggregated particles have grown to have a particle size suitable as toner particles, the aggregation may be stopped.

As a method of stopping aggregation, there are mentioned a method of cooling the dispersion, a method of adding an aggregation stopping agent, and a method of diluting the dispersion. From the viewpoint of surely preventing any unnecessary aggregation, a method of adding an aggregation stopping agent to stop aggregation is preferred.

[Aggregation Stopping Agent]

A surfactant is preferred as the aggregation stopping agent, and an anionic surfactant is more preferred. The aggregation stopping agent may be added in the form of an aqueous solution thereof.

The amount of the aggregation stopping agent to be added is preferably 1 part by mass or more relative to 100 parts by mass of resin in the resin particles, more preferably 5 parts by mass or more, from the viewpoint of surely preventing unnecessary aggregation, and is preferably 60 parts by mass or less, more preferably 30 parts by mass or less, even more preferably 20 parts by mass or less, from the viewpoint of reducing the agent from remaining in toner.

The volume median particle diameter $D_{50}$ of the aggregated particles is preferably 2 μm or more, more preferably 3 μm or more, even more preferably 4 μm or more, and is preferably 10 μm or less, more preferably 8 μm or less, even more preferably 6 μm or less. The volume median particle diameter $D_{50}$ of the aggregated particles is determined according to the method described in the section of Examples given hereinunder.

<Step 2>

In the step 2, for example, the aggregated particles are coalesced in an aqueous medium.

Accordingly, individual particles of the aggregated particles are coalesced to give coalesced particles.

The temperature in coalescence (hereinafter this may be referred to as "coalescing temperature") is preferably a temperature lower by 6° C. than the melting point of the resin C or higher, more preferably a temperature lower by 4° C. or higher, even more preferably a temperature lower by 2° C. or higher, and is preferably a temperature higher by 60° C. or lower, more preferably a temperature higher by 40° C. or lower, even more preferably a temperature higher by 20° C. or lower, from the viewpoint of providing a toner capable of attaining a high image density and capable of preventing chargeability reduction after storage under high-temperature high-humidity condition.

The time for which the particles are to be held at the coalescing temperature is not specifically limited, and by monitoring the degree of circularity of the coalesced particles, the time may be finished at the time when the degree of circularity thereof has reached a suitable range.

In the step 2, an acid substance may be added for coalescence.

Examples of the acid substance include inorganic acids and organic acids.

Among these, inorganic acids are preferred, and sulfuric acid is more preferred.

The addition method for the acid substance may be any of a method of adding it all at a time, or a method of adding it by dividing the entire amount into 2 or more portions for split addition, or a method of continuously adding it taking a predetermined period of time. Any of the split addition method or the continuous addition method taking a predetermined period of time is preferred, from the viewpoint of preventing further aggregation of the aggregated particles. The temperature in adding the acid substance is preferably within the range of the above-mentioned coalescing temperature.

The volume median particle diameter $D_{50}$ of the coalesced particles formed by coalescing is preferably 2 μm or more, more preferably 3 μm or more, even more preferably 4 μm or more, and is preferably 10 μm or less, more preferably 8 lam or less, even more preferably 6 μm or less. The volume median particle diameter $D_{50}$ of the coalesced particles is measured according to the same method as that for the toner particles to be mentioned hereinunder.

The degree of circularity of the coalesced particles formed by coalescing is preferably 0.955 or more, more preferably 0.960 or more, and is preferably 0.990 or less, more preferably 0.985 or less, even more preferably 0.980 or less.

<Post-Treatment Step>

After the step 2, a post-treatment step may be carried out, and by adequately isolating the coalesced particles through a solid-liquid separating step such as filtration, a washing step and a drying step, toner particles can be obtained.

As needed, an external additive is added to the thus-produced toner particles to give a toner.

The toner may be used as a one-component toner for development, or may be used as a two-component developing agent as combined with a carrier.

The toner is excellent in fusing property on PP films and in rubfastness after printed on PP films, and is preferably used as a toner for development of electrostatic images for printing on polypropylene films.

[Printing on PP Film]

Printing on a PP film using the toner may be carried out using an ordinary electrophotographic system.

Examples of the PP film include an unprocessed biaxially-stretched PP film, a corona treated PP film, a chemical treated PP film, a plasma treated PP film, and a stretched film of a composite resin of a PP and any other resin and additive. an unprocessed biaxially-stretched PP film and a corona treated PP film are preferred, from the viewpoint of cost.

The toner fusing temperature is preferably set to be not lower than the melting point of the polymer A, from the viewpoint of effectively generating interaction between the polymer A and a PP film The fusing temperature in electrophotography is preferably 180° C. or lower, more preferably 160° C. or lower, even more preferably 140° C. or lower, from the viewpoint of heat resistance of PP films, and is preferably 70° C. or higher, more preferably 80° C. or higher, even more preferably 90° C. or higher, from the viewpoint of fusing property.

The present invention further discloses the following <1> to <46>.

<1> A toner for development of electrostatic images containing an amorphous polyester-based resin A and a crystalline polyester-based resin C, wherein the amorphous polyester-based resin A has a constituent moiety derived from a polyester resin, and a constituent moiety derived from a reactive functional group-having modified polyolefin-based polymer A, the polyester resin-derived constituent moiety and the modified polyolefin-based polymer A-derived constituent moiety being bonded via a covalent bond, and the amount of the modified polyolefin-based polymer A-derived constituent moiety is 5% by mass or more and 30% by mass or less relative to the total amount of the resin component in the toner.

<2> The toner for development of electrostatic images according to <1>, wherein the Fedors' solubility parameter of the crystalline polyester-based resin C is preferably 9.0 $(cal/cm^3)^{1/2}$ or more, more preferably 9.2 $(cal/cm^3)^{1/2}$ or more, even more preferably 9.4 $(cal/cm^3)^{1/2}$ or more, and is preferably 10.5 $(cal/cm^3)^{1/2}$ or less, more preferably 10.3 $(cal/cm^3)^{1/2}$ or less, even more preferably 9.9 $(cal/cm^3)^{1/2}$ or less, further more preferably 9.8 $(cal/cm^3)^{1/2}$ or less, further more preferably 9.7 $(cal/cm^3)^{1/2}$ or less, further more preferably 9.6 $(cal/cm^3)^{1/2}$ or less.

<3> The toner for development of electrostatic images according to <1> or <2>, wherein the crystalline polyester-based resin C has at least a polyester resin segment of a polycondensate of an alcohol component containing an α,ω-aliphatic diol and a carboxylic acid component containing an aliphatic dicarboxylic acid.

<4> The toner for development of electrostatic images according to <3>, wherein the α,ω-aliphatic diol is preferably selected from ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, and 1,14-tetradecanediol, more preferably selected from ethylene glycol, 1,4-butanediol, 1,6-hexanediol, 1,10-decanediol and 1,12-dodecanediol, and even more preferably selected from 1,10-decanediol and 1,12-dodecanediol.

<5> The toner for development of electrostatic images according to <3> or <4>, wherein the content of the α,ω-aliphatic diol in the alcohol component is preferably 80 mol % or more, more preferably 85 mol % or more, even more preferably 90 mol % or more, further more preferably 95 mol % or more, and is 100 mol % or less, further more preferably 100 mol %.

<6> The toner for development of electrostatic images according to any of <3> to <5>, wherein the aliphatic dicarboxylic acid is preferably one or more selected from fumaric acid, sebacic acid, dodecanedioic acid and tetradecanedioic acid, more preferably one or more selected from sebacic acid and dodecanedioic acid, even more preferably sebacic acid.

<7> The toner for development of electrostatic images according to any of <3> to <6>, wherein the content of the aliphatic dicarboxylic acid in the carboxylic acid component is preferably 80 mol % or more, more preferably 85 mol % or more, even more preferably 90 mol % or more, further more preferably 95 mol % or more, and is 100 mol % or less, further more preferably 100 mol %.

<8> The toner for development of electrostatic images according to any of <3> to <7>, wherein the amount of the polyester resin segment in the crystalline polyester-based resin C is preferably 40% by mass or more, more preferably 50% by mass or more, and is preferably 95% by mass or less, more preferably 85% by mass or less.

<9> The toner for development of electrostatic images according to any of <3> to <8>, wherein the crystalline polyester-based resin C further has an addition polymer resin segment of an addition polymer of a raw material monomer containing a styrene compound.

<10> The toner for development of electrostatic images according to <9>, wherein the styrene compound is preferably at least one selected from styrene, methylstyrene, α-methylstyrene, β-methylstyrene, tert-butylstyrene, chlorostyrene, chloromethylstyrene, methoxystyrene, styrene-sulfonic acid and salts thereof, more preferably styrene.

<11> The toner for development of electrostatic images according to <9> or <10>, wherein the content of the styrene compound in the raw material monomer for the addition polymer resin segment is preferably 50% by mass or more, more preferably 70% by mass or more, even more preferably 80% by mass or more, further more preferably 90% by mass or more, and is 100% by mass or less, preferably 98% by mass or less, more preferably 95% by mass or less.

<12> The toner for development of electrostatic images according to any of <9> to <11>, wherein the amount of the addition polymer resin segment in the crystalline polyester-based resin C is, in the resin C, preferably 5% by mass or more, more preferably 10% by mass or more, even more preferably 15% by mass or more, and is preferably 60% by mass or less, more preferably 50% by mass or less.

<13> The toner for development of electrostatic images according to any of <9> to <11>, wherein the crystalline polyester-based resin C has a constituent unit derived from a bireactive monomer bonding to a polyester resin segment and an addition polymer resin segment via a covalent bond.

<14> The toner for development of electrostatic images according to <13>, wherein the bireactive monomer is preferably at least one selected from acrylic acid, methacrylic acid, fumaric acid and maleic acid, more preferably at least one selected from acrylic acid and methacrylic acid, even more preferably acrylic acid.

<15> The toner for development of electrostatic images according to <13> or <14>, wherein the content of the bireactive monomer-derived constituent unit is, in the crystalline polyester-based resin C, preferably 0.1% by mass or more, more preferably 0.5% by mass or more, even more preferably 0.8% by mass or more, and is preferably 10% by mass or less, more preferably 5% by mass or less, even more preferably 3% by mass or less.

<16> The toner for development of electrostatic images according to any of <9> to <15>, wherein the crystalline polyester-based resin C has a polyester resin segment and an addition polymer resin segment, and the total amount of the polyester resin segment, the addition polymer resin segment and the bireactive monomer-derived constituent unit is preferably 80% by mass or more, more preferably 90% by mass or more, even more preferably 93% by mass or more, further more preferably 95% by mass or more, and is 100% by mass or less.

<17> The toner for development of electrostatic images according to any of <1> to <16>, wherein the softening point of the crystalline polyester-based resin C is preferably 60° C. or higher, more preferably 70° C. or higher, even more preferably 80° C. or higher, and is preferably 170° C. or lower, more preferably 150° C. or lower, even more preferably 120° C. or lower, further more preferably 110° C. or lower.

<18> The toner for development of electrostatic images according to any of <1> to <17>, wherein the melting point of the crystalline polyester-based resin C is preferably 50° C. or higher, more preferably 60° C. or higher, even more preferably 70° C. or higher, and is preferably 100° C. or lower, more preferably 95° C. or lower, even more preferably 90° C. or lower.

<19> The toner for development of electrostatic images according to any of <1> to <18>, wherein the content of the crystalline polyester-based resin C relative to the total amount of all the resin components in the toner is preferably 0.1% by mass or more, more preferably 1% by mass or more, even more preferably 3% by mass or more, and is preferably 60% by mass or less, more preferably 40% by mass or less, even more preferably 35% by mass or less, further more preferably 30% by mass or less, further more preferably 20% by mass or less, further more preferably 10% by mass or less.

<20> The toner for development of electrostatic images according to any of <1> to <19>, wherein the polyester resin-derived constituent moiety and the modified polyolefin-based polymer A-derived constituent moiety are bonded via an ester bond.

<21> The toner for development of electrostatic images according to any of <1> to <20>, wherein the modified polyolefin-based polymer A is a modified polypropylene polymer.

<22> The toner for development of electrostatic images according to any of <1> to <21>, wherein the reactive functional group is a carboxylic acid group or a carboxylic anhydride group.

<23> The toner for development of electrostatic images according to any of <1> to <22>, wherein the modified polyolefin-based polymer A is a polypropylene polymer terminally-modified with an unsaturated bond-having carboxylic acid compound or an anhydride thereof (terminally-modified polypropylene polymer), or a polypropylene polymer randomly graft-modified with an unsaturated bond-having carboxylic acid compound or an anhydride thereof (randomly graft-modified polypropylene polymer).

<24> The toner for development of electrostatic images according to any of <1> to <23>, wherein the modified polyolefin-based polymer A is a polypropylene polymer terminally-modified with an unsaturated bond-having carboxylic acid compound or an anhydride thereof (terminally-modified polypropylene polymer).

<25> The toner for development of electrostatic images according to any of <1> to <24>, wherein the modified polyolefin-based polymer A is a polypropylene polymer modified at one terminal alone with an unsaturated bond-having carboxylic acid compound or an anhydride thereof (one-terminal-modified polypropylene polymer).

<26> The toner for development of electrostatic images according to any of <1> to <25>, wherein the modified polyolefin-based polymer A is preferably a terminal maleic anhydride-modified polypropylene or a copolymer of a terminal maleic anhydride-modified propylene and any other olefin, more preferably a terminal maleic anhydride-modified polypropylene, even more preferably a one-terminal maleic anhydride-modified polypropylene.

<27> The toner for development of electrostatic images according to any of <1> to <26>, wherein the melting point of the modified polyolefin-based polymer A is preferably 10° C. or higher, more preferably 20° C. or higher, even more preferably 40° C. or higher, further more preferably 60° C. or higher, further more preferably 70° C. or higher, further more preferably 80° C. or higher, and is preferably 170° C. or lower, more preferably 150° C. or lower, even more preferably 140° C. or lower, further more preferably 120° C. or lower, further more preferably 100° C. or lower.

<28> The toner for development of electrostatic images according to any of <1> to <27>, wherein the acid value of the modified polyolefin-based polymer A is preferably 200 mgKOH/g or less, more preferably 150 mgKOH/g or less, even more preferably 100 mgKOH/g or less, and is preferably 0.1 mgKOH/g or more, more preferably 1 mgKOH/g or more, even more preferably 5 mgKOH/g or more, further more preferably 10 mgKOH/g or more.

<29> The toner for development of electrostatic images according to any of <1> to <28>, wherein the number-average molecular weight of the modified polyolefin-based polymer A is preferably 300 or more, more preferably 500 or more, even more preferably 700 or more, further more preferably 800 or more, and is preferably 50,000 or less, more preferably 15,000 or less, even more preferably 8,000 or less, further more preferably 4,000 or less, further more preferably 3,000 or less.

<30> The toner for development of electrostatic images according to any of <1> to <29>, wherein the amount of the modified polyolefin-based polymer A-derived constituent moiety in the amorphous polyester-based resin A is preferably 5% by mass or more, more preferably 8% by mass or more, even more preferably 10% by mass or more, further more preferably 15% by mass or more, and is preferably 80% by mass or less, more preferably 60% by mass or less, even more preferably 40% by mass or less, further more preferably 35% by mass or less.

<31> The toner for development of electrostatic images according to any of <1> to <30>, wherein the amorphous polyester-based resin A is produced according to any of the following methods (a) and (b):

(a) A method of polycondensing a raw material monomer containing an alcohol component and a carboxylic acid component in the presence of a reactive functional group-having modified polyolefin-based polymer A, (b) A method of reacting a polyester resin with a reactive functional group-having modified polyolefin-based polymer A.

<32> The toner for development of electrostatic images according to any of <1> to <31>, wherein the softening point of the amorphous polyester-based resin A is preferably 80° C. or higher, more preferably 90° C. or higher, even more preferably 100° C. or higher, and is preferably 170° C. or lower, more preferably 150° C. or lower, even more preferably 120° C. or lower, further more preferably 110° C. or lower.

<33> The toner for development of electrostatic images according to any of <1> to <32>, wherein the glass transition temperature of the amorphous polyester-based resin A is preferably 40° C. or higher, more preferably 50° C. or higher, and is preferably 80° C. or lower, more preferably 70° C. or lower, even more preferably 60° C. or lower.

<34> The toner for development of electrostatic images according to any of <1> to <33>, wherein the crystal melting peak of the modified polyolefin-based polymer A-derived constituent moiety in the amorphous polyester-based resin A is preferably not detected, or is 140° C. or lower, more preferably 130° C. or lower, even more preferably 120° C. or lower, further more preferably 110° C. or lower, and is preferably 60° C. or higher, more preferably 70° C. or higher, even more preferably 80° C. or higher.

<35> The toner for development of electrostatic images according to any of <1> to <34>, wherein the content of the amorphous polyester-based resin A in the toner for development of electrostatic images is preferably 20% by mass or more relative to the total amount of the resin component in the toner, more preferably 30% by mass or more, even more preferably 40% by mass or more, and is preferably 90% by mass or less, more preferably 80% by mass or less, even more preferably 70% by mass or less, further more preferably 60% by mass or less.

<36> The toner for development of electrostatic images according to any of <1> to <35>, further containing an amorphous polyester-based resin B having a softening point differing by 5° C. or more from the softening point of the amorphous polyester-based resin A.

<37> The toner for development of electrostatic images according to <36>, wherein the ratio by mass of the amount of the crystalline polyester resin to the total amount of the amorphous polyester-based resin A and the amorphous polyester-based resin B (resin C/(resin A+resin B)) is preferably 0.1/99.9 or more, more preferably 1/99 or more, even more preferably 3/97 or more, and is preferably 60/40 or less, more preferably 40/60 or less, even more preferably 35/65 or less, further more preferably 30/70 or less.

<38> The toner for development of electrostatic images according to any of <1> to <37>, wherein the ratio by mass of the amount of the modified polyolefin-based polymer A-derived constituent moiety to the amount of the crystalline polyester-based resin C is preferably 10/90 or more, more preferably 20/80 or more, even more preferably 30/70 or more, further more preferably 40/60 or more, and is preferably 90/10 or less, more preferably 80/20 or less, even more preferably 75/25 or less.

<39> The toner for development of electrostatic images according to any of <1> to <38>, wherein the toner for development of electrostatic images is a pulverised toner according to melt-kneading method, or a chemical toner according to aggregation coalescence method.

<40> The toner for development of electrostatic images according to any of <1> to <39>, which is a toner for development of electrostatic images for printing on polypropylene films.

<41> A printing method using the toner for development of electrostatic images of <1> to <40> for printing on polypropylene films through electrophotography.

<42> The printing method according to <41>, wherein the polypropylene film is preferably selected from an unprocessed biaxially-stretched PP film, a corona treated PP film, a chemical treated PP film, a plasma treated PP film, and a stretched film of a composite resin of PP and any other resin and additive, more preferably selected from an unprocessed biaxially-stretched PP film and a corona treated PP film.

<43> The printing method according to <41> or <42>, wherein the toner fusing temperature in electrophotography is not lower than the melting point of the modified polyolefin-based polymer A.

<44> The printing method according to any of <41> to <43>, wherein the fusing temperature in electrophotography is preferably 180° C. or lower, more preferably 160° C. or lower, even more preferably 140° C. or lower, and is preferably 70° C. or higher, more preferably 80° C. or higher, even more preferably 90° C. or higher.

<45> A print obtained according to the method of any of <41> to <44>.

<46> A resin composition for a toner for development of electrostatic images containing an amorphous polyester-based resin A and a crystalline polyester-based resin C, wherein the amorphous polyester-based resin A has a constituent moiety derived from a polyester resin, and a constituent moiety derived from a reactive functional group-having modified polyolefin-based polymer A, the polyester resin-derived constituent moiety and the modified polyolefin-based polymer A-derived constituent moiety being bonded via a covalent bond, and the amount of the modified polyolefin-based polymer A-derived constituent moiety is 5% by mass or more and 30% by mass or less relative to the total amount of the resin component in the toner.

EXAMPLES

Properties were measured according to the methods mentioned below.
[Measurement Methods]
[Melting Point (Mp) of Polymer A]
Using a differential scanning calorimeter "DSC210" (by Seiko Instruments Inc.), a sample is heated up to 200° C., then cooled from that temperature down to 0° C. at a cooling rate of 10° C./min, and again heated at a heating rate of 10° C./min. A maximum peak temperature with respect to the melting heat is referred to as a melting point.
[Crystal Melting Peak Temperature of Polymer A in Resin and Polymer A Simple Substance]
A sample of a resin or a polymer A simple substance is heated up to 200° C. at a heating rate of 10° C./min, using a differential scanning calorimeter "Q-20" (by TA Instruments Japan Inc.), and the endothermic highest peak temperature read on the resultant melting endotherm curve is referred to as a crystal melting peak temperature of the polymer A. The crystal melting peak temperature of Ma-PP (Mn 1000) in the following Table is 102° C.
[Acid Value of Resin, and Polymer A]
Measured according to JIS K 0070:1992. However, only for the solvent for the measurement, the mixed solvent of ethanol and ether as prescribed in JIS K 0070:1992 is changed to a mixed solvent of chloroform and dimethylformamide (hereinafter also referred to as "DMF") (chloroform/DMF=7/3 (by volume)).
[Softening Point, Highest Peak Temperature, Glass Transition Temperature and Melting Point of Resin and Polymer A]
(1) Softening Point
Using a flow tester "CFT-500D" (by Shimadzu Corporation), 1 g of a sample is extruded through a nozzle having a die pore diameter of 1 mm and a length of 1 mm while heating the sample at a heating rate of 6° C./minute and applying a load of 1.96 MPa thereto by a plunger. The softening point is determined as the temperature at which a half amount of the sample has flowed out when plotting a downward movement of the plunger of the flow tester relative to the temperature.

(2) Endothermic Highest Peak Temperature and Melting Point of Resin

Using a differential scanning calorimeter "Q-20" (by TA Instruments Japan Inc.), 0.01 to 0.02 g of a sample is weighed in an aluminum pan, then cooled from room temperature to 0° C. at a cooling rate of 10° C./minute and then allowed to stand as such under the conditions for 1 minute. Subsequently, this is heated at a heating rate of 50° C./min. Among the thus-observed endothermic peaks derived from the resin or the polyester resin-derived constituent moiety, the temperature of the peak located on the highest temperature side is defined as the endothermic highest peak temperature of the resin. When the highest peak temperature differs from the softening point within a range of 20° C., it is a melting point.

The peak for the polyester resin-derived constituent moiety can be assigned according to an ordinary method, and an endothermic peak derived from a modified polyolefin-based polymer A-derived constituent moiety generally appears on a low-temperature side. In the case where assignment to any peak is unclear, a polyester resin alone and a modified polyolefin-based polymer A alone are separately measured using a differential scanning calorimeter under the condition mentioned above, and the endothermic peak at a temperature nearer to each endothermic peak thereof is assigned to the endothermic peak derived from each constituent moiety.

(3) Glass Transition Temperature

Using a differential scanning calorimeter "Q-20" (by TA Instruments Japan Inc.), a sample is weighed in an amount of 0.01 to 0.02 g in an aluminum pan, heated up to 200° C. and then cooled from the temperature to 0° C. at a cooling rate of 10° C./minute. Next, the sample is heated at a heating rate of 10° C./minute to measure the endothermic peak thereof.

The temperature at which an extension of the baseline below the endothermic highest temperature is intersected with a tangential line having a maximum inclination of the curve in the range of from a rise-up portion to an apex of the peak is read as the glass transition temperature of the sample.

[Melting Point of Releasing Agent]

Using a differential scanning calorimeter "Q-100" (by TA Instruments Japan Inc.), 0.02 g a sample is weighed in an aluminum pan, heated up to 200° C. and then cooled from 200° C. to 0° C. at a cooling rate of 10° C./minute. Next, the sample is heated at a heating rate of 10° C./minute to measure the quantity of heat, and the endothermic maximum peak temperature is referred to as a melting point.

[Volume Median Diameter ($D_{50}$) and CV Value of Resin Particles, Releasing Agent Particles and Colorant Particles]
(1) Measuring Apparatus: Laser Diffraction-Type Particle Sizer "LA-920" (by Horiba Ltd.)
(2) Measuring Conditions:

Distilled water is added to a measurement cell, and the volume median diameter ($D_{50}$) and the volume-average particle size are measured at a concentration at which the absorbance could falls within an appropriate range. The CV value (particle size distribution) is calculated according to the following expression.

$CV$ value (%)=(standard deviation of particle size distribution/volume-average particle size)×100

[Solid Concentration in Resin Particle Dispersion, Releasing Agent Particle Dispersion, and Colorant Particle Dispersion]

Using an infrared moisture meter "FD-230" (by Kett Electric Laboratory), 5 g of a sample to be analyzed was dried at a drying temperature of 150° C. under a measuring mode 96 (monitoring time: 2.5 minutes, moisture variation range: 0.05%), and then subjected to measurement of a water content (% by mass) of the sample. The solid concentration was calculated according to the following expression.

Solid concentration (% by mass)=100−water content (% by mass)

[Average Particle Size of External Additive]

The average particle size of an external additive means a number-average particle size thereof. A number-average value of the particle size of 500 particles, as measured on a scanning electron microscope (SEM) image of a fluidizing agent and an external additive is referred to as an average particle size of the fluidizing agent and the external additive. When the particle has a major axis and a minor axis, the particle size indicates the major axis.

[Volume Median Diameter ($D_{50}$) of Toner Particles]

The volume median diameter ($D_{50}$) of toner particles is measured by the following method.

Measuring apparatus: "Coulter Multisizer II" (by Beckman Coulter Inc.)

Aperture diameter: 100 μm

Analyzing software: "Coulter Multisizer AccuComp Ver. 1.19" (by Beckman Coulter Inc.)

Electrolyte solution: "Isotone II" (by Beckman Coulter Inc.)

Dispersion: 5 mass % electrolyte dispersion of "Emulgen 109P" (by Kao Corporation, polyoxyethylene lauryl ether, HLB: 13.6)

Dispersing Conditions:

10 mg of a sample to be analyzed is added to 5 mL of the aforementioned dispersion, and dispersed therein using an ultrasonic disperser for 1 minute. Thereafter, 25 mL of the electrolyte solution is added to the resultant dispersion, and the resultant mixture is further dispersed using the ultrasonic disperser for 1 minute to prepare a sample dispersion.

Measuring Conditions:

The sample dispersion is added to 100 mL of the electrolyte solution so as to have such a concentration that the particle size of 30,000 particles therein could be measured in 20 seconds, and 30,000 particles are measured, and the volume median diameter ($D_{50}$) of the toner particles is determined from the particle size distribution thereof.

[Production of Resin]

Production Examples A1 to A5, A81 and B1
(Resins A-1 to A-5, A-81, and B-1)

As shown in Table 1, raw material monomers for polyester resin, an esterification catalyst and a promoter were put into a 10-L four-necked flask equipped with a thermometer, a stainless steel stirring bar, a falling type condenser having a dewatering tube, and a nitrogen inlet tube, heated up to 180° C. in a nitrogen atmosphere, and thereafter further heated up to 230° C. by 5° C./hr, and after all the solid monomers were confirmed to have been melted and reacted, this was depressurized down to 8 kPa, and processed for dewatering condensation for 1 hour. Subsequently, this was cooled down to 160° C. under normal pressure, then the polymer A was added and further reacted for 1 hour while kept at 220° C., and thereafter subjected to condensation at 220° C. under 8 kPa until the softening point could reach the value as in Table 1 to give resins A-1 to A-5, A-81, and B-1. The properties of those resins were measured and shown in Table 1.

TABLE 1

| | | | Production Example | | | | | | | |
|---|---|---|---|---|---|---|---|---|---|---|
| | | | A1 | | A2 | | A3 | | A4 | |
| | | | Resin | | | | | | | |
| | | | A-1 | | A-2 | | A-3 | | A-4 | |
| | | | charged amount (g) | molar ratio *1 | charged amount (g) | molar ratio *1 | charged amount (g) | molar ratio *1 | charged amount (g) | molar ratio *1 |
| Raw Material Monomers for Polyester Resin | Alcohol Component | BPA-PO *4 | 5987 | 100 | 5702 | 100 | 4989 | 100 | 6414 | 100 |
| | | BPA-EO *4 | — | — | — | — | — | — | — | — |
| | Carboxylic Acid Component | Terephthalic Acid | 241.3 | 85 | 2299 | 85 | 2011 | 85 | 2585 | 85 |
| | | Trimellitic Acid | — | — | — | — | — | — | — | — |
| | | Adipic Acid | — | — | — | — | — | — | — | — |
| | | | charged amount (g) | % by mass *2 | charged amount (g) | % by mass *2 | charged amount (g) | % by mass *2 | charged amount (g) | % by mass *2 |
| Polymer A | Ma-PP (Mn 1000) *5 | | 1500 | 16 | 1875 | 20 | 2813 | 30 | — | — |
| | Ma-PP/Hex (Mn 4000) *6 | | — | — | — | — | — | — | 973 | 11 |
| | PP/PE-g-Ma *7 | | — | — | — | — | — | — | — | — |
| | | | charged amount (g) | molar ratio *3 | charged amount (g) | molar ratio *3 | charged amount (g) | molar ratio *3 | charged amount (g) | molar ratio *3 |
| Esterification catalyst | Tin(II) 2-Ethylhexanoate | | 42 | 0.5 | 40 | 0.5 | 35 | 0.5 | 45 | 0.5 |
| Promoter | Gallic Acid | | 4.2 | 0.05 | 4 | 0.05 | 3.5 | 0.05 | 4.5 | 0.05 |
| Properties | Softening Point (° C.) | | 105 | | 105 | | 107 | | 105 | |
| | Endothermic Highest Peak Temperature [melting point] (° C.) | | 65 | | 65 | | 65 | | 65 | |
| | Crystallinity Index | | 1.6 | | 1.6 | | 1.6 | | 1.6 | |
| | Glass Transition Temperature (° C.) | | 56 | | 56 | | 51 | | 63 | |
| | Polymer A-Derived Crystal Melting Peak Temperature (° C.) | | 102 | | 102 | | 99 | | 85 | |

| | | | Production Example | | | | | |
|---|---|---|---|---|---|---|---|---|
| | | | A5 | | A81 | | B1 | |
| | | | Resin | | | | | |
| | | | A-5 | | A-81 | | B-1 | |
| | | | charged amount (g) | molar ratio *1 | charged amount (g) | molar ratio *1 | charged amount (g) | molar ratio *1 |
| Raw Material Monomers for Polyester Resin | Alcohol Component | BPA-PO *4 | 6414 | 100 | 6699 | 100 | 4965 | 70 |
| | | BPA-EO *4 | — | — | — | — | 1976 | 30 |
| | Carboxylic Acid Component | Terephthalic Acid | 2585 | 85 | 2701 | 85 | 1597 | 47 |
| | | Trimellitic Acid | — | — | — | — | 865 | 22 |
| | | Adipic Acid | — | — | — | — | 598 | 20 |
| | | | charged amount (g) | % by mass *2 | charged amount (g) | % by mass *2 | charged amount (g) | % by mass *2 |
| Polymer A | Ma-PP (Mn 1000) *5 | | — | — | 563 | 6 | — | — |
| | Ma-PP/Hex (Mn 4000) *6 | | — | — | — | — | — | — |
| | PP/PE-g-Ma *7 | | 973 | 11 | — | — | — | — |
| | | | charged amount (g) | part by mass *3 | charged amount (g) | part by mass *3 | charged amount (g) | part by mass *3 |
| Esterification catalyst | Tin(II) 2-Ethylhexanoate | | 45 | 0.5 | 47 | 0.5 | 30 | 0.3 |
| Promoter | Gallic Acid | | 4.5 | 0.05 | 4.7 | 0.05 | 1 | 0.01 |
| Properties | Softening Point (° C.) | | 99 | | 102 | | 129 | |
| | Endothermic Highest Peak Temperature [melting point] (° C.) | | 65 | | 65 | | 70 | |
| | Crystallinity Index | | 1.5 | | 1.6 | | 1.8 | |
| | Glass Transition Temperature (° C.) | | 56 | | 58 | | 61 | |

TABLE 1-continued

| | | |
|---|---|---|
| Polymer A-Derived Crystal Melting Peak Temperature (° C.) | 100 | 100 | — |

*1 Number of mols relative to 100 mols of the total amount of alcohol component.
*2 Amount of polymer A-derived constituent moiety in resin (% by mass), as calculated in consideration of water removal.
*3 Amount (part by mass) relative to 100 parts by mass of raw material monomers for polyester resin.
*4 BPA-PO: Propylene oxide (2.2) adduct of bisphenol A BPA-EO: Ethylene oxide (2.2) adduct of bisphenol A
*5 Ma-PP (Mn 1000): One-terminal maleic anhydride-modified polypropylene "X-10065" (by BAKER HUGHES, number-average molecular weight Mn 1000, melting point 90° C., acid value 100 mg KOH/g)
*6 Ma-PP/Hex (Mn 4000): One-terminal maleic anhydride-modified propylene/hexene copolymer "X-10052" (by BAKER HUGHES, number-average molecular weight Mn 4000, melting point 80° C., acid value 25 mgKOH/g)
*7PP/PE-g-Ma: Randomly grafted maleic anhydride-modified ethylene/propylene copolymer "TOYO-TAC PMA-T" (by TOYOBO CO., LTD, number-average molecular weight Mn 10600, melting point 93° C., acid value 35 mgKOH/g)

Production Examples C1 to C6 (Resins C-1 to C-6)

As shown in Table 2, raw material monomers and an esterification catalyst were put into a 10-L four-necked flask equipped with a nitrogen inlet tube, a dewatering conduit, a stirrer and a thermocouple, then heated from 130° C. up to 200° C. under a nitrogen atmosphere taking 10 hours, and reacted at 200° C. under 8 kPa for 1 hour to give resins C-1 to C-6. The properties of the resultant resins are shown in Table 2.

Production Examples C7 and C8 (Resins C-7 and C-8)

As shown in Table 2, raw material monomers (P) for polyester resin and an esterification catalyst were put into a 10-L four-necked flask equipped with a nitrogen inlet tube, a dewatering conduit, a stirrer and a thermocouple, then heated up to 160° C., and reacted for 6 hours. Subsequently, as shown in Table 2, a raw material monomer (V) for addition polymer resin, a bireactive monomer (D) and a polymerization initiator were dropwise added through a dropping funnel taking 1 hour. While kept at 160° C., the addition polymerization reaction was ripened for 1 hour, and then kept under 8.3 kPa for 1 hour. Further, this was heated up to 200° C. taking 8 hours, and reacted under 8.3 kPa for 2 hours to give resins C-7 and C-8. The properties of the resultant resins are shown in Table 2.

TABLE 2

| | | | Production Example | | | | | | | |
|---|---|---|---|---|---|---|---|---|---|---|
| | | | C1 | | C2 | | C3 | | C4 | |
| | | | Resin | | | | | | | |
| | | | C-1 | | C-2 | | C-3 | | C-4 | |
| | | | charged amount (g) | molar ratio *1 | charged amount (g) | molar ratio *1 | charged amount (g) | molar ratio *1 | charged amount (g) | molar ratio *1 |
| Raw Material Monomers (P) for Polyester Resin | Alcohol Component | 1,12-Dodecanediol | 5000 | 100 | — | — | — | — | — | — |
| | | 1,10-Dodecanediol | — | — | 4628 | 100 | — | — | — | — |
| | | 1,6-Hexanediol | — | — | — | — | 3391 | 100 | 3688 | 100 |
| | | 1,4-Butanediol | — | — | — | — | — | — | — | — |
| | | Ethylene Glycol | — | — | — | — | — | — | — | — |
| | Carboxylic Acid Component | Sebacic Acid | 5000 | 100 | 5372 | 100 | — | — | 6313 | 100 |
| | | Dodecanedioic Acid | — | — | — | — | 6609 | 100 | — | — |
| Bireactive Monomer (D) | | Acrylic Acid | — | — | — | — | — | — | — | — |

| | | | charged amount (g) | part by mass *2 | charged amount (g) | part by mass *2 | charged amount (g) | part by mass *2 | charged amount (g) | part by mass *2 |
|---|---|---|---|---|---|---|---|---|---|---|
| Raw Material Monomer (V) for Addition Polymer Resin | Styrene | | — | — | — | — | — | — | — | — |
| Polymerization Initiator | Dicumyl Peroxide | | — | — | — | — | — | — | — | — |

| | | | charged amount (g) | part by mass *3 | charged amount (g) | part by mass *3 | charged amount (g) | part by mass *3 | charged amount (g) | part by mass *3 |
|---|---|---|---|---|---|---|---|---|---|---|
| Esterification catalyst | | Tin(II) 2-Ethylhexanoate | 20 | 0.2 | 20 | 0.2 | 20 | 0.2 | 20 | 0.2 |
| Polyester Resin Segment/Addition Polymer Resin Segment *4 | | | — | | — | | — | | — | |
| Properties | Softening Point (° C.) | | 101 | | 86 | | 84 | | 79 | |
| | Endothermic Highest Peak Temperature (melting point) (° C.) | | 88 | | 77 | | 76 | | 71 | |
| | Crystallinity Index | | 1.1 | | 1.1 | | 1.1 | | 1.1 | |
| | Solubility Parameter (SP value) | | 9.5 | | 9.6 | | 9.7 | | 9.8 | |

TABLE 2-continued

| | | | C5 | | C6 | | C7 | | C8 | |
|---|---|---|---|---|---|---|---|---|---|---|
| | | | \multicolumn{8}{c}{Resin} | | | | |
| | | | C-5 | | C-6 | | C-7 | | C-8 | |
| | | | charged amount (g) | molar ratio *1 | charged amount (g) | molar ratio *1 | charged amount (g) | molar ratio *1 | charged amount (g) | molar ratio *1 |
| Raw Material Monomers (P) for Polyester Resin | Alcohol Component | 1,12-Dodecanediol | — | — | — | — | 4156 | 100 | — | — |
| | | 1,10-Dodecanediol | — | — | — | — | — | — | 3858 | 100 |
| | | 1,6-Hexanediol | — | — | — | — | — | — | — | — |
| | | 1,4-Butanediol | 3082 | 100 | — | — | — | — | — | — |
| | | Ethylene Glycol | — | — | 2349 | 100 | — | — | — | — |
| | Carboxylic Acid Component | Sebacic Acid | 6918 | 100 | 7652 | 100 | 3740 | 90 | 4031 | 90 |
| | | Dodecanedioic Acid | — | — | — | — | — | — | — | — |
| Bireactive Monomer (D) | | Acrylic Acid | — | — | — | — | 104 | 7 | 112 | 7 |

| | | | charged amount (g) | part by mass *2 | charged amount (g) | part by mass *2 | charged amount (g) | part by mass *2 | charged amount (g) | part by mass *2 |
|---|---|---|---|---|---|---|---|---|---|---|
| Raw Material Monomer (V) for Addition Polymer Resin | Styrene | | — | — | — | — | 1723 | 100 | 1711 | 100 |
| Polymerization Initiator | Dicumyl Peroxide | | — | — | — | — | 103 | 6 | 103 | 6 |

| | | | charged amount (g) | part by mass *3 | charged amount (g) | part by mass *3 | charged amount (g) | part by mass *3 | charged amount (g) | part by mass *3 |
|---|---|---|---|---|---|---|---|---|---|---|
| Esterification catalyst | | Tin(II) 2-Ethylhexanoate | 20 | 0.2 | 20 | 0.2 | 16 | 0.2 | 16 | 0.2 |
| Polyester Resin Segment/Addition Polymer Resin Segment *4 | | | — | | — | | 80/20 | | 80/20 | |
| Properties | Softening Point (° C.) | | 74 | | 80 | | 85 | | 82 | |
| | Endothermic Highest Peak Temperature (melting point) (° C.) | | 68 | | 76 | | 78 | | 69 | |
| | Crystallinity Index | | 1.1 | | 1.1 | | 1.1 | | 1.2 | |
| | Solubility Parameter (SP value) | | 10.2 | | 10.2 | | 9.7 | | 9.7 | |

*1 Molar ratio of each monomer constituting the raw material monomers (P) and the bireactive monomer, based on the alcohol component. 100 mol of the raw material monomers (P).
*2 Amount (part by mass) relative to 100 parts by mass of the raw material monomer (V).
*3 Amount (part by mass) relative to 100 parts by mass of the total amount of the raw material monomers (P).
*4 The polyester resin segment corresponds to the raw material monomers (P) from which the amount of removed water was excluded, and the addition polymer segment contained the mass of the raw material monomer (V) and the polymerization initiator (ratio by mass).

[Production of Resin Particle Dispersion]

Production Example X1 (Production of Resin Particle Dispersion X-1)

300 g of the resin A2, 270 g of the resin B1, 30 g of the resin C1 and 600 g of methyl ethyl ketone were put into a 3-L reactor equipped with a stirrer, a reflux condenser, a dropping funnel, a thermometer and a nitrogen inlet tube, and dissolved at 73° C. taking 2 hours. 107 g of an aqueous solution of 5 mass % sodium hydroxide was added to the resultant solution, and stirred for 30 minutes.

Next, while kept at 73° C. with stirring at 200 r/min, 1200 g of deionized water was added taking 1 hour for transfer-phase emulsification. Methyl ethyl ketone was evaporated away from the resultant solution under reduced pressure to give an aqueous dispersion. Subsequently, with stirring, the aqueous dispersion was cooled to 30° C., and then deionized water was added to have a solid concentration of 35% by mass, thereby preparing a resin particle dispersion X-1. The volume median particle diameter $D_{50}$ of the resultant resin particles was 0.19 μm, and the CV value thereof was 30%.

[Production of Releasing Agent Particle Dispersion]

Production Example W1 (Production of Releasing Agent Particle Dispersion W-1)

130 g of deionized water, 45.7 g of the resin particle dispersion X-1 and 40 g of paraffin wax "HNP-9" (by Nippon Seiro Co., Ltd., melting point: 75° C.) were added to a 1-L beaker, and melted while kept at a temperature of 90 to 95° C., then stirred to give a molten mixture. While further kept at a temperature of 90 to 95° C., the resultant molten mixture was dispersed for 20 minutes, using an ultrasonic homogenizer "US-600T" (by Nihonseiki Kaisha, Ltd.), and then cooled down to room temperature. Deionized water was added to make the solid concentration 20% by mass to give a releasing agent particle dispersion W-1. The volume median particle diameter $D_{50}$ of the releasing agent particles in the dispersion was 0.57 μm and the CV value thereof was 27%.

[Production of Colorant Dispersion]

Production Example E1 (Production of Colorant Dispersion E-1)

67.5 g of a copper phthalocyanine pigment "ECB-301" (C.I. Pigment Blue 15:3, by Dainichiseika Color & Chemicals Mfg. Co., Ltd.), 189 g of an anionic surfactant "Neopelex (registered trademark) G-15" (by Kao Corporation, aqueous solution of 15 mass % sodium dodecylbenzenesulfonate), and 100 g of deionized water were mixed in a 1-L beaker, and dispersed at room temperature for 3 hours using a homogenizer, and thereafter deionized water was added so as to have a solid concentration of 25% by mass to give a colorant dispersion E-1. The volume median particle diameter $D_{50}$ of the colorant particles in the dispersion was 125 nm.

[Production of Toner]

Examples 1 to 13, 15, 16, and Comparative Examples 1 to 2 (Production of Toners 1 to 13, 15, 16, 81 and 82)

100 parts by mass of the binder resin shown in Table 3 and a releasing agent "HNP-9" (by Nippon Seiro Co., Ltd., paraffin wax, melting point: 80° C.)), and 0.5 parts by mass of a charge control agent "Bontron E-304" (by Orient Chemical Industries Co., Ltd.), and 4.5 parts by mass of a colorant "ECB-301" (by Dainichiseika Color & Chemicals Mfg. Co., Ltd., C.I. Pigment Blue 15:3) were fully mixed in a Henschel mixer, and then melt-kneaded under the conditions shown below.

A continuous dual roll-type kneading machine "Kneadex" (by Nippon Coke & Engineering Co., Ltd., roll outer diameter: 14 cm, effective roll length: 80 cm) was used. The driving conditions of the continuous dual roll-type kneading machine were: peripheral speed of high-rotation side roll (front roll) 32.4 m/min, peripheral speed of low-rotation side roll (back roll) 21.7 m/min, roll-to-roll distance 0.1 mm. The heating medium temperature and the cooling medium temperature inside the roll were: 145° C. on the material input side of the high-rotation side roll and 100° C. on the kneaded mixture output side thereof, and 75° C. on the material input side of the low-rotation side roll, and 35° C. on the kneaded mixture output side thereof. The feed rate of the raw material mixture was 10 kg/hr, and the average residence time was about 3 minutes.

The resultant resin mixture was cooled and roughly pulverized with a grinding machine "Rotoplex" (by Hosokawa Micron Corporation) to give a roughly pulverized product having a volume median particle diameter of 2 mm or less through a sieve having an opening of 2 mm. The resultant roughly pulverized product was finely pulverized using an airflow classifying machine "DS2 Model" (impact plate type, by Nippon Pneumatic Mfg. Co., Ltd.) to make the roughly pulverized product have a volume median particle diameter ($D_{50}$) of 7.5 μm while controlling the pulverized pressure. The resultant finely pulverized product was classified using an airflow classifying machine "DSX2 Model" (Nippon Pneumatic Mfg. Co., Ltd.) while the static pressure (internal pressure) was controlled to make the resultant finely pulverized product have a volume median particle diameter ($D_{50}$) of 8.5 μm to thereby give toner particles.

As external additives, 1.0 part by mass of "R972" (hydrophobic silica, by Nippon Aerosil Co., Ltd., number-average particle size: 16 nm) and 1.0 part by mass of "RX50" (hydrophobic silica, by Nippon Aerosil Co., Ltd., number-average particle size: 40 nm) were added to 100 parts by mass of the resultant toner particles, and mixed with a Henschel mixer at 3700 r/min for 3 minutes for external additive treatment to give toners 1 to 13, 15, 16, 81 and 82.

Example 14 (Production of Toner 14)

In Example 2, the toner raw materials were mixed with a Henschel mixer and then melt-kneaded under the following conditions.

Using a unidirectional twin-screw extruder having an overall kneading zone length of 1560 mm, a screw diameter of 42 mm and a barrel inner diameter of 43 mm, at a roll rotating speed of 200 r/min, and at a heating temperature in the roll of 100° C., the mixture was melt-kneaded. The feed rate of the mixture was 20 kg/hr, and the average residence time was about 18 seconds.

The resultant resin kneaded product was roughly pulverized, then finely pulverized and classified in the same manner as in Example 2 to give toner particles.

Thus obtained, the toner particles were mixed with external additives in the same manner as in Example 2 to give a toner 14.

Example 17 (Production of Toner 17)

In a 5-L four-necked flask equipped with a dewatering conduit, a stirrer and a thermocouple, 500 g of the resin particle dispersion X-1, 37 g of the releasing agent particle dispersion W-1, 45 g of the colorant particle dispersion E-1, 18 g of an aqueous 10 mass % solution of polyoxyethylene (50) lauryl ether "Emulgen 150" (by Kao Corporation, nonionic surfactant), and 18 g of an aqueous 15 mass % solution of sodium dodecylbenzenesulfonate "Neopelex G-15" (by Kao Corporation, anionic surfactant) were mixed at a temperature of 25° C. Next, with stirring the mixture, a solution prepared by adding 27 g of an aqueous 4.8 mass % solution of potassium hydroxide in an aqueous solution of 62 g of ammonium sulfate in 967 g of deionized water was dropwise added to the mixture at 25° C. taking 10 minutes, and then heated up to 68° C. taking 2 hours to give a dispersion of aggregated particles.

An aqueous solution prepared by mixing 156 g of polyoxyethylene lauryl ether sodium sulfate "Emal E-27C" (by Kao Corporation, anionic surfactant, effective concentration 27% by mass), 958 g of deionized water, and 58 g of a aqueous 0.1 mol/L solution of sulfuric acid was added to the resultant dispersion of aggregated particles. Subsequently, this was heated up to 90° C. taking 1 hour, and then kept at 90° C. for 30 minutes to give a dispersion of coalesced particles having a volume median particle diameter $D_{50}$ of 8.5 μm.

The resultant dispersion of coalesced particles was cooled at 30° C., then filtered under suction to separate the solid fraction, which was washed with deionized water at 25° C., and dried in vacuum at 30° C. for 48 hours to give toner particles.

As external additives, 1.0 part by mass of "R972" (hydrophobic silica, by Nippon Aerosil Co., Ltd., number-average particle size: 16 nm) and 1.0 part by mass of "RX50" (hydrophobic silica, by Nippon Aerosil Co., Ltd., number-average particle size: 40 nm) were added to 100 parts by mass of the resultant toner particles, and mixed with a Henschel mixer at 3700 r/min for 3 minutes for external additive treatment to give a toner 17.

[Evaluation Method]
[Fusing Property on PP Film]

The toner was charged into a nonmagnetic one-component developing machine "OKI MICROLINE 5400" (by Oki Data Corporation), in which the toner deposition amount was controlled to be 0.45±0.03 mg/cm$^2$, and a solid image of 2.0 cm×1.5 cm was printed on an unprocessed biaxially-stretched polypropylene film "Torayfan industrial type 2500" (by Toray Industries, Inc., thickness 60 μm) and fused thereon at a fusing temperature of 140° C.

The fused image was peeled with an adhesive cellophane tape, and the fusing ratio was calculated as [(image area before tape peeling−image area after tape peeling)/(image area before tape peeling)]×100. A higher fusing ratio indicates a higher fusing property on PP films.

[T-Type Peel Strength]

The toner was charged into a nonmagnetic one-component developing machine "OKI MICROLINE 5400" (by Oki Data Corporation), in which the toner deposition amount was controlled to be 0.45±0.03 mg/cm$^2$, and a solid image of 2.5 cm×15.0 cm was printed on an unprocessed biaxially-stretched polypropylene film "Torayfan industrial type 2500" (by Toray Industries, Inc., thickness 60 μm). A fresh unprocessed biaxially-stretched polypropylene film was put on the printed image, which was then fused as such at a fusing temperature of 150° C. Using a desktop material testing machine (by A & D Corporation), the prepared sample was peeled at a moving rate of 100 mm/min to measure the applied load.

[Rubfastness]

The toner was charged into a nonmagnetic one-component developing machine "OKI MICROLINE 5400" (by Oki Data Corporation), in which the toner deposition amount was controlled to be 0.45±0.03 mg/cm$^2$, and a solid image of 2.0 cm×1.5 cm was printed on an unprocessed biaxially-stretched polypropylene film "Torayfan industrial type 2500" (by Toray Industries, Inc., thickness 60 μm) and fused thereon at a fusing temperature of 140° C.

The fused image was scuffed with a rubfastness tester (by Daiei Kagaku Seiki Mfg. Co., Ltd.) to check for toner layer peeling. The load in scuffing was 300 g, and the scuffing frequency was 100 times, 300 times and 500 times.

(Evaluation Criteria)

A: The toner layer did not peel in a scuffing frequency of 500 times.
B: The toner layer did not peel in a scuffing frequency of 300 times, but peeled in a scuffing frequency of 500 times.
C: The toner layer did not peel in a scuffing frequency of 100 times, but peeled in a scuffing frequency of 300 times.
D: The toner layer peeled in a scuffing frequency of 100 times.

As above, it is known that the toners of Examples have excellent fusing property on PP films and rubfastness, as compared with the toners of Comparative Examples.

The invention claimed is:

1. A toner for development of electrostatic images, comprising an amorphous polyester-based resin A and a crystalline polyester-based resin C, wherein:
    the amorphous polyester-based resin A comprises a polyester resin-derived constituent moiety that is derived from a polyester resin, and a modified polyolefin-based polymer A-derived constituent moiety that is derived from a reactive functional group-having modified polyolefin-based polymer A, and the polyester resin-derived constituent moiety and the modified polyolefin-based polymer A-derived constituent moiety are bonded via a covalent bond, and
    an amount of the modified polyolefin-based polymer A-derived constituent moiety is from 5% by mass to 15% by mass relative to a total amount of resin component in the toner.

2. The toner of claim 1, wherein a Fedors' solubility parameter of the crystalline polyester-based resin C is from 9.0 (cal/cm$^3$)$^{1/2}$ to 10.5 (cal/cm$^3$)$^{1/2}$.

3. The toner of claim 1, wherein the crystalline polyester-based resin C comprises a polyester resin segment of a polycondensate of an alcohol component comprising an α,ω-aliphatic diol and a carboxylic acid component comprising an aliphatic dicarboxylic acid.

4. The toner of claim 3, wherein the crystalline polyester-based resin C further comprises an addition polymer resin segment of an addition polymer of a raw material monomer comprising a styrene compound.

5. The toner of claim 1, wherein the polyester resin-derived constituent moiety and the modified polyolefin-based polymer A-derived constituent moiety are bonded via an ester bond.

TABLE 3

| | | Binder Resin | | | | | | Amount of | Toner Properties | | |
| | | Amorphous Resin A | | Amorphous Resin B | | Crystalline Resin C | | Polymer A | Releasing agent | Polymer A-Derived | Fusing Property | T-type Peel | |
| | Toner kind | kind | part by mass | kind | part by mass | kind | part by mass | part by mass | part by mass | Constituent Moiety*1 | on PP Film (%) | Strength (N) | Rubfastness |
|---|---|---|---|---|---|---|---|---|---|---|---|---|---|
| Example 1 | 1 | A-1 | 50 | B-1 | 45 | C-1 | 5 | — | 3 | 8 | 85 | 1.0 | B |
| Example 2 | 2 | A-2 | 50 | B-1 | 45 | C-1 | 5 | — | 3 | 10 | 100 | 1.2 | A |
| Example 3 | 3 | A-3 | 50 | B-1 | 45 | C-1 | 5 | — | 3 | 15 | 100 | 1.4 | A |
| Example 4 | 4 | A-2 | 50 | B-1 | 40 | C-1 | 10 | — | 3 | 10 | 100 | 1.3 | A |
| Example 5 | 5 | A-2 | 50 | B-1 | 45 | C-2 | 5 | — | 3 | 10 | 100 | 1.2 | A |
| Example 6 | 6 | A-2 | 50 | B-1 | 45 | C-3 | 5 | — | 3 | 10 | 100 | 1.0 | B |
| Example 7 | 7 | A-2 | 50 | B-1 | 45 | C-4 | 5 | — | 3 | 10 | 100 | 1.0 | B |
| Example 8 | 8 | A-2 | 50 | B-1 | 45 | C-5 | 5 | — | 3 | 10 | 95 | 1.0 | B |
| Example 9 | 9 | A-2 | 50 | B-1 | 45 | C-6 | 5 | — | 3 | 10 | 95 | 1.0 | B |
| Example 10 | 10 | A-2 | 50 | B-1 | 45 | C-7 | 5 | — | 3 | 10 | 95 | 1.0 | B |
| Example 11 | 11 | A-2 | 50 | B-1 | 45 | C-8 | 5 | — | 3 | 10 | 95 | 1.0 | B |
| Example 12 | 12 | A-2 | 50 | B-1 | 45 | C-1 | 5 | — | — | 10 | 100 | 1.7 | A |
| Example 13 | 13 | A-2 | 70 | — | — | C-2 | 30 | — | 3 | 14 | 100 | 1.2 | A |
| Example 14 | 14 | A-2 | 50 | B-1 | 45 | C-1 | 5 | — | 3 | 10 | 100 | 1.2 | A |
| Example 15 | 15 | A-4 | 50 | B-1 | 45 | C-1 | 5 | — | 3 | 5.5 | 84 | 0.9 | B |
| Example 16 | 16 | A-5 | 50 | B-1 | 45 | C-1 | 5 | — | 3 | 5.5 | 83 | 0.8 | B |
| Example 17 | 17 | A-2 | 50 | B-1 | 45 | C-1 | 5 | — | 3 | 10 | 100 | 1.3 | A |
| Comparative Example 1 | 81 | A-81 | 50 | B-1 | 45 | C-1 | 5 | — | 3 | 3 | 55 | 0.2 | C |
| Comparative Example 2 | 82 | — | — | B-1 | 100 | C-1 | 5 | 10 | 3 | 0 | 0 | 0.02 | D |

*1Amount of the polymer A-derived constituent moiety, relative to the total amount of the amorphous resin A, the amorphous resin B and the crystalline resin C (mass %).

6. The toner of claim 1, wherein the modified polyolefin-based polymer A is a modified polypropylene polymer.

7. The toner of claim 1, wherein the reactive functional group is a carboxylic acid group or a carboxylic anhydride group.

8. The toner of claim 1, wherein a number-average molecular weight of the modified polyolefin-based polymer A is from 500 to 8,000.

9. The toner of claim 1, further comprising an amorphous polyester-based resin B that has a softening point differing by at least 5° C. from the softening point of the amorphous polyester-based resin A.

10. The toner of claim 1, wherein a content of the crystalline polyester-based resin C is from 3% by mass to 40% by mass relative to the total amount of all the resin components in the toner.

11. The toner of claim 1, wherein an amount of the modified polyolefin-based polymer A-derived constituent moiety in the amorphous polyester-based resin A is from 5% by mass to 80% by mass.

12. The toner of claim 1, wherein a ratio by mass of the amount of the modified polyolefin-based polymer A-derived constituent moiety to the amount of the crystalline polyester-based resin C is from 10/90 to 90/10 .

13. A method for development of electrostatic images, the method comprising:
printing an image of a polypropylene film by applying the toner of claim 1.

14. A printing method, comprising:
applying the toner of claim 1 on a polypropylene film at a fusing temperature of from 70° C. to 180° C. to carry out a printing according to electrophotography.

15. A resin composition for a toner for development of electrostatic images that comprises an amorphous polyester-based resin A and a crystalline polyester-based resin C, wherein:

the amorphous polyester-based resin A has a polyester resin-derived constituent moiety derived from a polyester resin, and a modified polyolefin-based polymer A-derived constituent moiety derived from a reactive functional group-having modified polyolefin-based polymer A, and the polyester resin-derived constituent moiety and the modified polyolefin-based polymer A-derived constituent moiety are bonded via a covalent bond, and an amount of the modified polyolefin-based polymer A-derived constituent moiety is from 5% by mass to 15% by mass relative to the total amount of the resin component in the toner.

16. The toner of claim 1, wherein a melting point of the modified polyolefin-based polymer A is 10° C. to 170° C.

17. A printing method, comprising:
applying the toner of claim 1 on a polypropylene film through electrophotography to carry out a printing, wherein a toner fusing temperature in the electrophotography is not lower than a melting point of the modified polyolefin-based polymer A.

18. The toner of claim 1, wherein the modified polyolefin-based polymer A is a polyolefin-based polymer which is terminal-modified with a carboxylic acid compound having an unsaturated bond or an anhydride thereof.

19. The toner of claim 1 wherein the modified polyolefin-based polymer A is a polypropylene polymer which is terminal-modified with a carboxylic acid compound. having an unsaturated bond or an anhydride thereof.

20. The toner of claim 19, wherein the carboxylic acid compound having an unsaturated bond is maleic acid or an anhydride thereof.

* * * * *